US007447997B2

(12) United States Patent
Colle

(10) Patent No.: US 7,447,997 B2
(45) Date of Patent: Nov. 4, 2008

(54) REDUCING INFORMATION TRANSFER IN SCREEN CAPTURE SERIES

(75) Inventor: Olivier Colle, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 10/160,697

(22) Filed: May 30, 2002

(65) Prior Publication Data

US 2004/0222995 A1 Nov. 11, 2004

(51) Int. Cl.
*G06F 3/00* (2006.01)

(52) U.S. Cl. ........................ 715/764; 715/781; 715/788; 715/802; 715/803; 715/804; 715/798

(58) Field of Classification Search ................. 715/700, 715/781, 788, 802, 803, 704, 798, 804; 345/165
See application file for complete search history.

(56) References Cited

U.S. PATENT DOCUMENTS

| | | | | |
|---|---|---|---|---|
| 4,937,036 | A * | 6/1990 | Beard et al. | 345/156 |
| 5,043,919 | A | 8/1991 | Callaway et al. | |
| 5,241,625 | A * | 8/1993 | Epard et al. | 345/502 |
| 5,266,941 | A | 11/1993 | Akeley et al. | |
| 5,394,170 | A | 2/1995 | Akeley et al. | |
| 5,678,002 | A | 10/1997 | Fawcett et al. | 345/709 |
| 5,745,738 | A | 4/1998 | Ricard | 703/13 |
| 6,226,407 | B1 * | 5/2001 | Zabih et al. | 382/209 |
| 6,421,738 | B1 | 7/2002 | Ratan et al. | |
| 6,573,915 | B1 * | 6/2003 | Sivan et al. | 715/781 |
| 6,748,391 | B1 * | 6/2004 | Schwerdtfeger et al. | 707/102 |

OTHER PUBLICATIONS

Cumhur Aksoy, "Wireless Thin Client Optimization for Multimedia Applications," M.S. Thesis, 166 pp. (2000).
Edward Doering, "Low-Cost, High-Impact Video Production Techniques for Laboratory Instructional Materials," *ASEE/IEEE Frontiers in Education Conference*, Session F1C, pp. 14-18 (Oct. 2001).
Microsoft Corporation, "BitBlt" 8 pp. [Downloaded from the World Wide Web on Apr. 25, 2002.]
Nieh et al., "Measuring the Multimedia Performance of Server-Based Computing," *Proc. 10th Intl. Workshop on Network and Operating System Support for Digital Audio and Video*, 10 pp. (2000).

(Continued)

*Primary Examiner*—Weilun Lo
*Assistant Examiner*—Mylinh Tran
(74) *Attorney, Agent, or Firm*—Klarquist Sparkman, LLP

(57) ABSTRACT

A screen capture tool reduces information transfer when capturing a series of screen areas. For example, the screen capture tool reduces usage of Bit Block Transfer operations from a display card frame buffer to system memory. The screen capture tool scans pixel values in portions of a screen area to detect changes relative to a previously captured screen area, identifying portions to be updated by BitBlt operation. Or, the screen capture tool analyzes display driver commands to identify portions of a screen area to be updated by BitBlt operation. The screen capture tool then constructs a representation of the screen area. For example, the screen capture tool provides portions of the screen area that do not require a BitBlt operation (which may involve copying or other use of pixel information already in system memory) and then captures other portions of the screen area by BitBlt operation.

50 Claims, 14 Drawing Sheets

OTHER PUBLICATIONS

Palmer et al., "Shared Desktop: A Collaborative Tool for Sharing 3-D Applications Among Different Window Systems," *Digital Technical Journal*, vol. 9, No. 3, pp. 42-49 (1997).
Rob Pike, "Graphics in Overlapping Bitmap Layers," *Computing Science Technical Report No. 999*, At&T Bell Labs., 25 pp. (1983).
Henning Schulzrinne, "Operating System Issues for Continuous Media," *ACM Multimedia Systems*, vol. 4, No. 5, 13 pp. (1996).
Techsmith Corporation, "Techsmith Camtasia Screen Recorder SDK," 2 pp. (2001).
Techsmith Corporation, "Camtasia Feature of the Week, Jan. 4, 2001, Quick Capture," 2 pp. (2001).
Techsmith Corporation, "Camtasia Screen Recorder SDK DLL API User Guide," version 1.0, 66 pp. (2001).
Techsmith Corporation, "Camtasia v3.0.1—README.TXT," 19 pp. (Jan. 2002).
OPTX International, "OPTX Improves Technology-Based Training with Screen Watch™ 3.0. Versatile Screen Capture Software Adds High Color and Live Webcast Support," 1 p., document marked Feb. 15, 2001 [downloaded from the World Wide Web on Sep. 22, 2005].
OPTX International, "OPTX International Marks One Year Anniversary of Screen Watch With Release of New 2.0 Version," 1 p., document marked May 16, 2000 [downloaded from the World Wide Web on Sep. 22, 2005].
OPTX International, "New Screen Watch™ 4.0 Click and Stream™ Wizard From OPTX International Makes Workplace Communication Effortless," 1 p., document marked Sep. 24, 2001 [downloaded from the World Wide Web on Sep. 22, 2005].
Gill et al., "Creating High-Quality Content with Microsoft Windows Media Encoder 7," 4 pp. (2000). [Downloaded from the World Wide Web on May 1, 2002.]
Li et al., "Optimal Linear Interpolation Coding for Server-Based Computing," *Proc. IEEE Int'l Conf. on Communications*, 5 pp. (Apr.-May 2002).
Matthias, "An Overview of Microsoft Windows Media Screen Technology," 3 pp. (2000). [Downloaded from the World Wide Web on May 1, 2002.]
Schaar-Mitrea et al., "Hybrid Compression of Video with Graphics in DTV Communication Systems," *IEEE Trans. on Consumer Electronics*, pp. 1007-1017 (2000).
Microsoft Corporation, printouts about Windows 2000 Terminal Services, 29 pp. [Downloaded from the World Wide Web on Oct. 26, 2005.]
Microsoft Corporation, "Windows 2000 Terminal Services Printer Redirection," 37 pp. [Document marked copyright 2002; downloaded from the World Wide Web on Oct. 26, 2005.]
Microsoft Corporation, "Windows 2000 Terminal Services: An Integrated, Server-based Computing Solution," 7 pp. [Document marked copyright 1999; downloaded from the World Wide Web on Oct. 26, 2005.]
Microsoft Corporation, "Remote Desktop Protocol (RDP) Features and Performance," 15 pp. [Document marked copyright 2000; downloaded from the World Wide Web on Oct. 26, 2005.]
"Draw flowcharts with Word and PowerPoint," 11 pp. (downloaded from the World Wide Web on Nov. 29, 2006).
"Drawing in Microsoft Word," 7 pp. (document marked 2000).
"Stacking images in Word, Excel, and PowerPoint," 4 pp. (downloaded from the World Wide Web on Nov. 29, 2006).
"The Microsoft Office Drawing Toolbar (Introduction & Intermediate)," BATS—Baseline Access, Training & Support, 17 pp. (document marked 2003).

* cited by examiner

Figure 1a, Prior Art
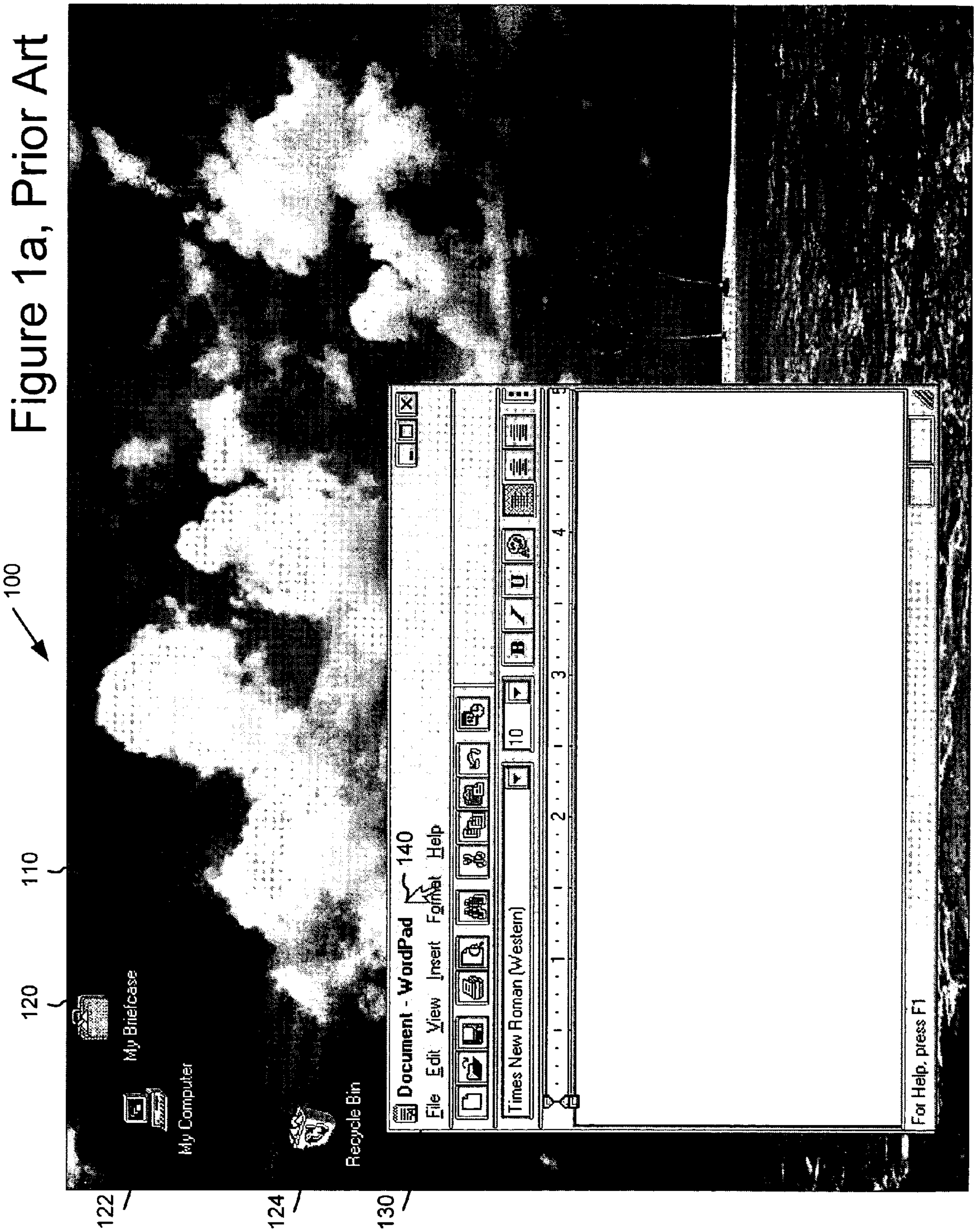

Figure 1b, Prior Art
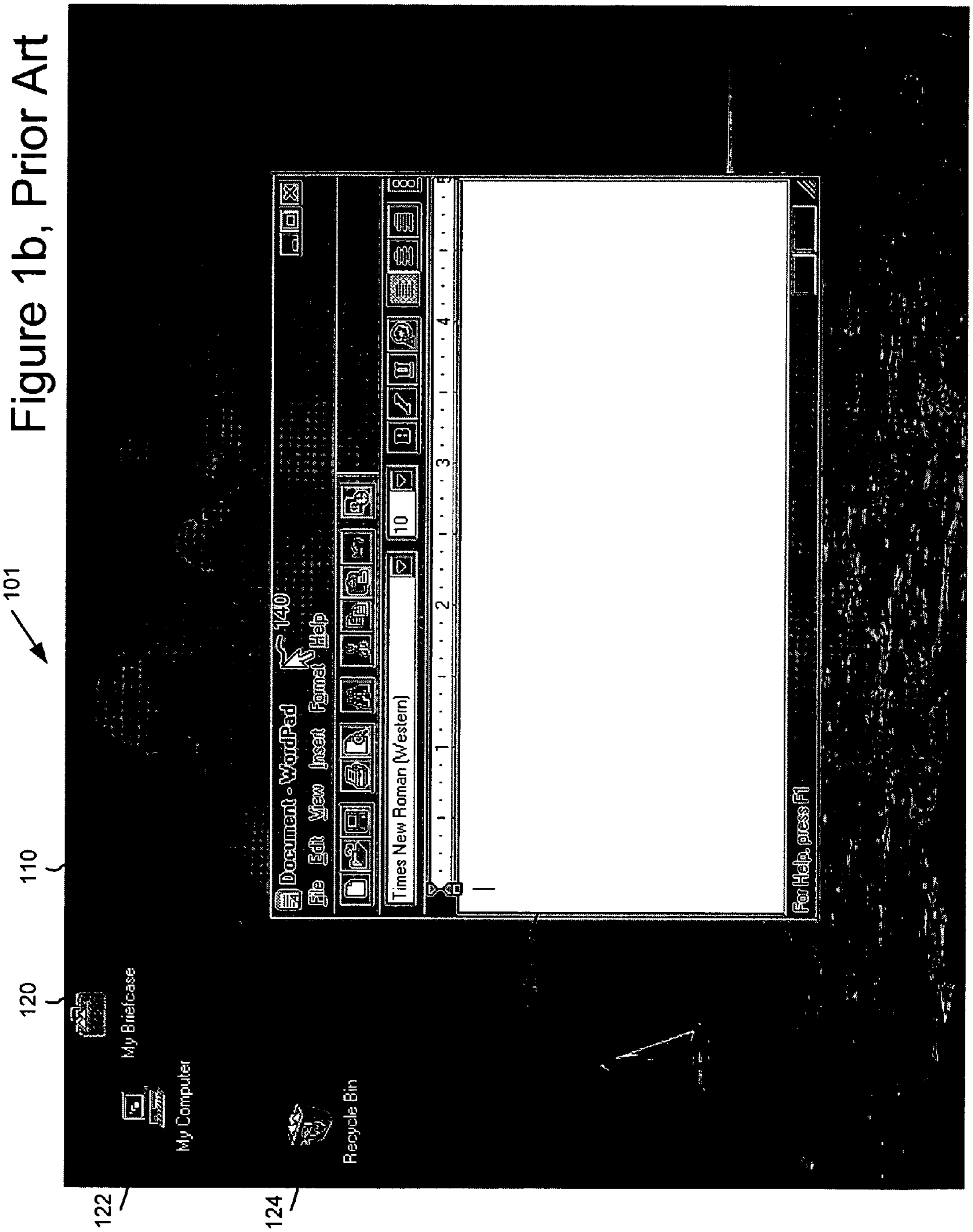

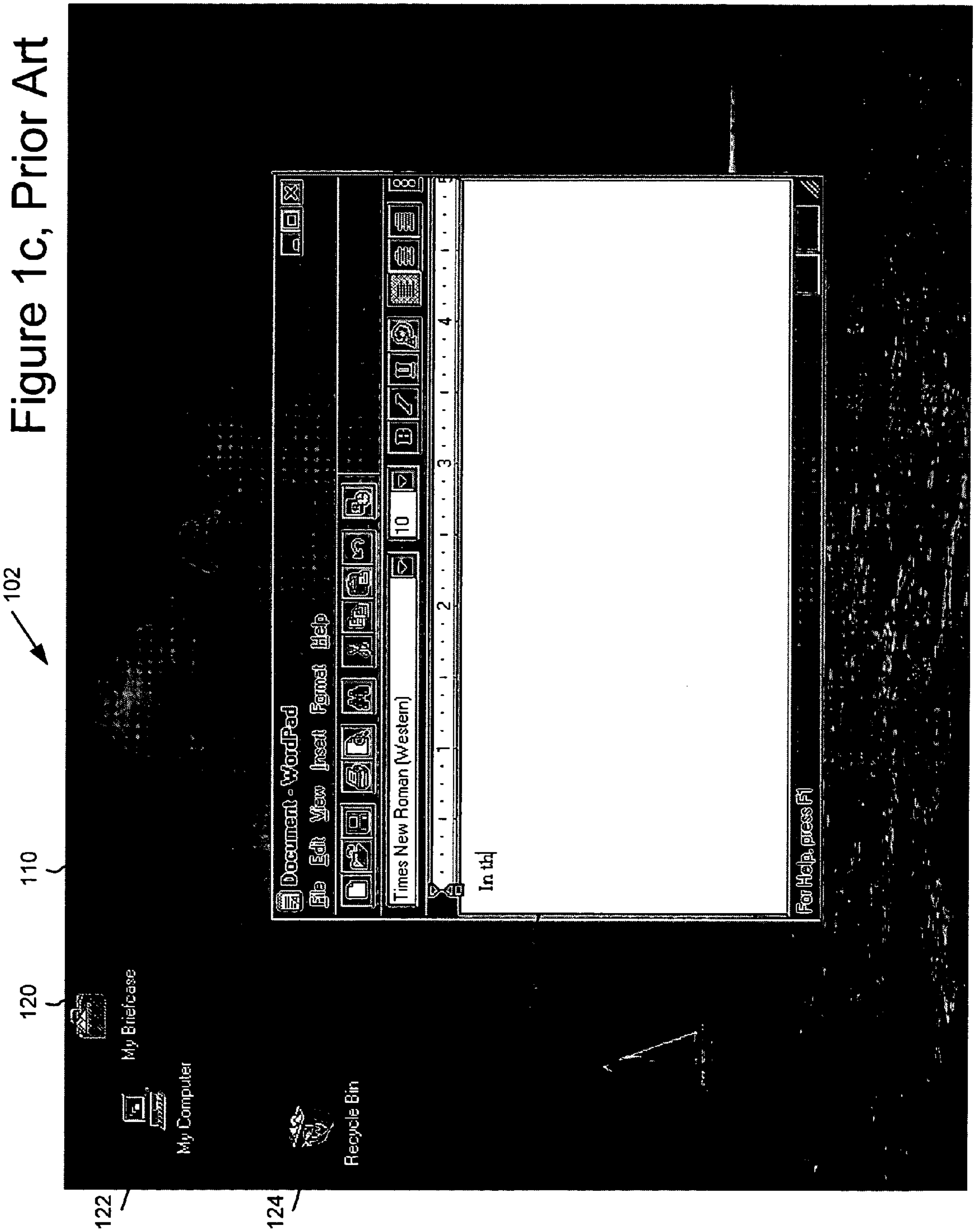
Figure 1c, Prior Art

Figure 2, Prior Art
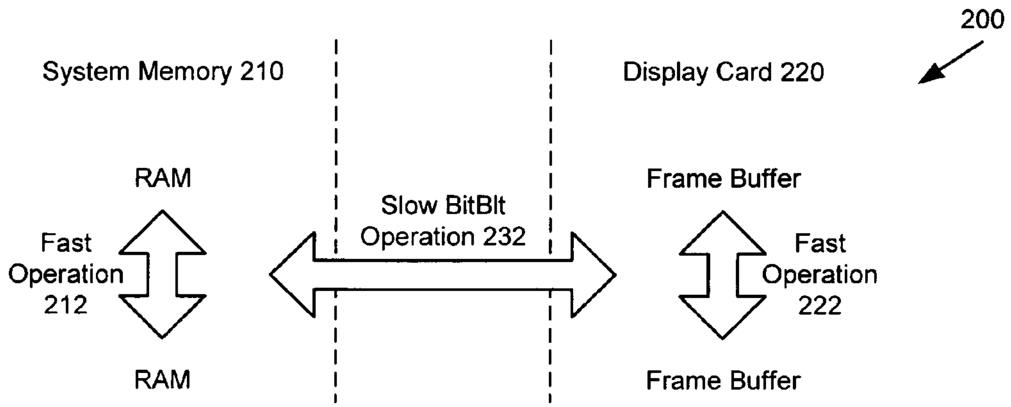
Figure 3
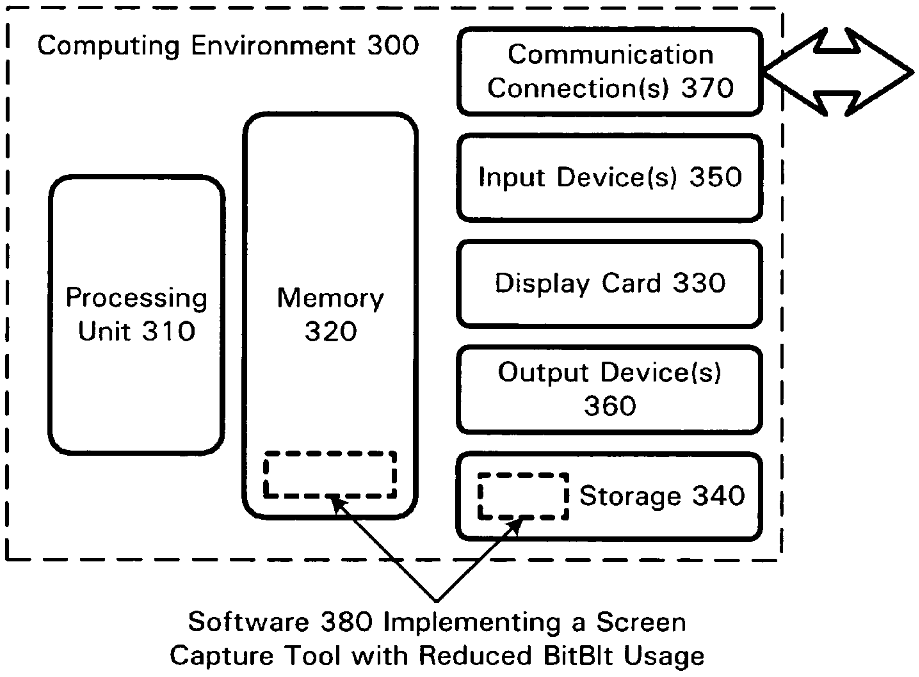

Figure 12a

1200

```
/*****************************************************************************************************************
 * Description: GetProcessCommand - Returns a command to execute depending on the commands for 2 rectangles
 *                                  and the relation between the 2 rectangles
 * Author: OColle
*****************************************************************************************************************/

enumRectangleProcessingCommand  GetProcessCommand( enumCommandType ectNewEntry, enumCommandType
                                                   ectEntryInList, enumRectangleRelationship errRectRel )
{
  static const RECTPROCESSCOMMAND stcRectProcessCmd[] = {
    /* New Command       | Command in List     |  Relation                         | Processing Command(s) */
    { commandCopyBuffer,  commandCopyBuffer,   rrRect1EqualRect2,                 erpcNoActionStopScanning},

    { commandCopyBuffer,  commandCopyBuffer,   rrRect1IncludedInRect2,            erpcNoActionStopScanning},

    { commandCopyBuffer,  commandCopyBuffer,   rrRect2IncludedInRect1,            erpcMergeCopyBuffer},

    { commandCopyBuffer,  commandCopyBuffer,   rrNewUnionAreaLessThanIntArea,     erpcMergeCopyBuffer},

    { commandCopyBuffer,  commandCopyBuffer,   rrNoIntersection,                  erpcNoActionNextElement},

    { commandCopyBuffer,  commandMoveBuffer,   rrRect1EqualRect2,                 erpcMergeCopyBuffer },

    { commandCopyBuffer,  commandMoveBuffer,   rrRect1IncludedInRect2,            erpcMergeIfRect1IsHalfBigger,
                                                                                  erpcCheckIntersectionWithSource },

    { commandCopyBuffer,  commandMoveBuffer,   rrRect2IncludedInRect1,            erpcMergeCopyBuffer },

    { commandCopyBuffer,  commandMoveBuffer,   rrNewUnionAreaLessThanIntArea,     erpcMergeCopyBufferIfIntersectisBig,
                                                                                  erpcCheckIntersectionWithSource },

    { commandCopyBuffer,  commandMoveBuffer,   rrNoIntersection,                  erpcNoActionNextElement,
                                                                                  erpcCheckIntersectionWithSource },
```

to Figure 12b

Figure 12b

1200 to Figure 12a

```
{ commandMoveBuffer,   commandCopyBuffer,   rrRect1EqualRect2,                 erpcNoActionStopScanning},
{ commandMoveBuffer,   commandCopyBuffer,   rrRect1IncludedInRect2,            erpcNoActionStopScanning},
{ commandMoveBuffer,   commandCopyBuffer,   rrRect2IncludedInRect1,            erpcNoActionNextElement},
{ commandMoveBuffer,   commandCopyBuffer,   rrNewUnionAreaLessThanIntArea,     erpcNoActionNextElement},
{ commandMoveBuffer,   commandCopyBuffer,   rrNoIntersection,                  erpcNoActionNextElement},
{ commandMoveBuffer,   commandMoveBuffer,   rrRect1EqualRect2,                 erpcConsiderRectSource},
{ commandMoveBuffer,   commandMoveBuffer,   rrRect1IncludedInRect2,            erpcConsiderRectSource},
{ commandMoveBuffer,   commandMoveBuffer,   rrRect2IncludedInRect1,            erpcConsiderRectSource},
{ commandMoveBuffer,   commandMoveBuffer,   rrNewUnionAreaLessThanIntArea,     erpcConsiderRectSource},
{ commandMoveBuffer,   commandMoveBuffer,   rrNoIntersection,                  erpcConsiderRectSource}
};
```

to Figure 12c

Figure 12c to Figure 12b

1200

```
  int nTableIndex = 0 ;
  if ( errRectRel == rrRect1EqualRect2 )
      nTableIndex = 0 ;
  else
      if ( errRectRel == rrRect1IncludedInRect2 )
          nTableIndex = 1 ;
      else
          if ( errRectRel == rrRect2IncludedInRect1 )
              nTableIndex = 2 ;
          else
              if ( ( errRectRel == rrNewUnionAreaLessThanIntArea ) || ( errRectRel == rrAdjacent ) )
                  nTableIndex = 3 ;
              else
                  nTableIndex = 4 ;

  nTableIndex += ((int) ectNewEntry * 10) + ((int) ectEntryInList * 5) ;
  _ASSERT( nTableIndex < 20 ) ;

// Get the command associated with it
  return( stcRectProcessCmd[ nTableIndex ].erpcProcessCommands );

}
```

REDUCING INFORMATION TRANSFER IN SCREEN CAPTURE SERIES

TECHNICAL FIELD

The present invention relates to reducing information transfer when capturing a series of screen areas. For example, a screen capture tool reduces or even eliminates Bit Block Transfers from a display card frame buffer to system memory when capturing a screen area.

BACKGROUND

A screen capture tool lets a computer user record an image displayed on a visual display unit such as a computer monitor. The user might use the captured screen area (alternatively called a screen area, screen image, screen shot, screen frame, screen region, capture area, capture image, capture shot, etc.) in a help manual or report to show the results displayed on the display unit at a particular time.

FIG. 1*a* is a captured screen area (100) of a computer desktop environment according to the prior art. The captured screen area (100) shows the entire desktop, but could instead show only the window (130) or some other portion of the desktop. A cursor graphic (140) overlays the window (130), and several icon graphics (120, 122, 124) overlay the background (110).

For some applications, a user captures a series of screen areas to show how screen content changes. The user might use the series of captured screen areas within an instructional video for job training or remote instruction.

FIGS. 1*b* and 1*c* show captured screen areas (101, 102) following the captured screen area (100) of FIG. 1*a* in a series according to the prior art. Much of the screen content shown in FIGS. 1*a*-1*c* is identical. Screen content such as the background (110) and icon graphics (120, 122, 124) usually does not change from frame to frame. On the other hand, the cursor graphic (140) often changes position and shape as the user manipulates a mouse or other input device, and the contents of the window (130) often change as a user types, adds graphics, etc. FIG. 1*b* shows the cursor graphic (140) and the window (130) changing locations as the user drags the window (130) across the desktop, which in turn changes which portions of the background (110) are exposed. FIG. 1*c* shows the contents of the window (130) changing after typing by the user, while the cursor graphic (140) has disappeared.

When a series of screen areas is captured in quick succession (for example, 10 frames per second) or when a window displays slowly changing content, changes in screen content from frame to frame tend to be small. On the other hand, when screen capture is infrequent or when a window displays quickly changing content such as a video game or animation, changes from frame to frame tend to be more pronounced. Dramatic changes in screen content can also occur when windows or menus are opened, closed, moved, resized, etc.

The quality of a series of captured screen areas depends on several factors. Higher resolution and higher frame rate increase quality, but also increase performance costs. To understand how quality affects performance of a screen capture tool, it helps to understand how a computer represents and captures screen areas.

I. Computer Representation of Captured Screen Areas

A single rectangular captured screen area includes rows of picture elements ["pixels"] with color values. The resolution of the captured screen area depends on the number of pixels and the color depth. The number of pixels is conventionally expressed in terms of the dimensions of the rectangle, for example, 320×240 or 800×600. The color depth is conventionally expressed as a number of bits per pixel, for example, 1, 8, 16, 24 or 32, which affects the number of possible colors for an individual pixel. If the color depth is 8 bits, for example, there are $2^8=256$ possible colors per pixel, which can be shades of gray or indices to a color palette that stores 256 different 24-bit colors in the captured screen area. A captured screen area represented by pixels and stored as a collection of bits, with each pixel having a color value, is an example of a bitmap.

The frame rate of a series of captured screen areas (i.e., the resolution in time) is conventionally expressed in terms of frames per second ["fps"]. Some conventional frame rates are 1, 2, 10, 15, 25, and 30 fps. A higher frame rate generally results in smoother playback of changing screen content.

Quality affects the number of bits needed to represent a series of captured screen areas, which in turn affects the costs of capturing, processing, storing, and transmitting the series. Table 1 shows the bit rates (bits per second) of several uncompressed series of captured screen areas of different quality.

| Spatial Resolution (pixels hor × vert) | Color Depth (bits) | Frame Rate (fps) | Bit Rate (bits per second) |
|---|---|---|---|
| 320 × 240 | 8 | 2 | 1,228,800 |
| 320 × 240 | 24 | 2 | 3,686,400 |
| 800 × 600 | 24 | 2 | 23,040,000 |
| 800 × 600 | 24 | 10 | 115,200,000 |

Table 1: Bit Rates of Series of Captured Screen Areas of Different Quality.

The preceding examples generally illustrate representation of captured screen areas in computer systems. In practice a variety of different formats and conventions are used in various different representations of captured screen areas in different computer systems and stages of processing.

II. Display and Capture of Captured Screen Areas

Most computer systems include a display card, which stores information for output to a visual display unit. Common terms for display card include video card, graphics card, graphics output device, display adapter, video graphics adapter, etc.

On the display card, a frame buffer stores pixel information from which the display unit is refreshed. In addition to the frame buffer, the display card can include a graphics processor, graphics accelerator or other hardware to make display functions more efficient. A digital to analog converter converts digital information in the frame buffer to an analog form, and the analog information is transmitted to the display unit. Conventionally, screen content is refreshed pixel-by-pixel across a row of the display unit, the rows are refreshed row-by-row from top to bottom, and the process repeats such that the entire screen is refreshed 60 or more times per second. In one common scenario, a computer system loads display driver software for the display card into system memory. The computer system accesses various features of the display card through display driver software.

In a conventional screen capture operation, information is transferred from the display card frame buffer back to system memory of the computer system. The display driver and/or other layers of software in the computer system often facilitate such transfer by supporting a Bit Block Transfer ["BitBlt"] operation, which a screen capture tool can utilize. In general, in a BitBlt operation, the computer system transfers pixel information from a source (e.g., display card frame buffer) to a destination (e.g., system memory). Depending on implementation, the software application can specify parameters such as the source, the destination, and the coordinates and dimensions of a rectangle in the source or destination for which information should be retrieved.

III. Performance Costs of Screen Capture

High resolution, frame rate, and color depth tend to improve quality but also increase performance costs in terms of capture, processing, storage, and transmission. For screen capture applications, there are several performance bottlenecks.

Since a series of captured screen areas can have a very high bit rate, there can be performance bottlenecks at the points of storing the series or transmitting the series across a network. Compression of captured screen areas is often used to address these performance bottlenecks by decreasing bit rate (at times, at some cost to quality).

Another performance bottleneck occurs at the point of screen capture. BitBlt operations are a bottleneck during screen capture due to two factors: 1) the amount of data transferred from the display card frame buffer to the system memory and 2) color format conversions that may be required between the frame buffer and the system memory. For instance, some display cards store pixels in YUV color coordinates, while others use a non-planar RGB representation. A BitBlt operation typically converts the pixel information in the frame buffer to a standard representation such as planar RGB. FIG. 2 illustrates the bottleneck between system memory (210) and a display card frame buffer (220) of a computer system (200) during screen capture. While operations (212, 222) within system memory (210) or the display card frame buffer (220) are fast, the BitBlt operation (232) is slow.

The bottleneck between the display card frame buffer and system memory impedes screen capture at high resolutions and frame rates. As a result, a user may have to sacrifice spatial resolution, color depth, and/or frame rate to produce a series a captured screen areas with a screen capture tool.

Several attempts have been made in screen capture tools to address the bottleneck between the display card frame buffer and system memory. In one attempt, a screen capture tool performs a full screen capture when some developer-defined event (such as a user causing the rotation of an object displayed on the screen) triggers the screen capture. The rest of the time the screen capture tool captures cursor movement or nothing at all. While this helps eliminate screen capture operations in carefully controlled scenarios, it can be inflexible and inefficient. Screen content may change but not trigger capture events, so the changes do not show up in a series of captured screen areas. Moreover, a developer must define the capture events, which can require specialized knowledge and access to source code. Finally, the capture events trigger full captures of the screen areas, even if most of a captured screen area did not change.

In another attempt to address the bottleneck between the display card frame buffer and system memory, rather than performing full screen captures, a screen capture tool captures screen areas that change when a user moves a mouse, clicks a mouse button, or presses a key on the keyboard. This helps provide smoother capture of cursor movement and changes in a foreground window, but can completely miss other changes in screen content, such as a background animation or user interface updates. For instance, web pages often have user interface containers that update themselves without any user interaction.

While prior attempts to address the bottleneck between the display card frame buffer and system memory improve performance in some scenarios, they lack flexibility and are inefficient in many other scenarios.

SUMMARY

The present invention relates to reducing information transfer when capturing a series of screen areas. For example, a screen capture tool reduces usage of BitBlt operations from a display card frame buffer to system memory. This improves performance in a wide variety of screen capture scenarios, enabling screen capture at higher resolutions and frame rates, and even allowing screen capture on computer systems where it was not feasible before.

For example, to reduce information transfer in screen capture, a screen capture tool analyzes display driver commands to identify portions of a screen area to be captured by BitBlt operation. Or, the screen capture tool scans pixel values in portions of a screen area to detect changes relative to a previously captured screen area, thus identifying portions to be captured by BitBlt operation.

The screen capture tool then constructs a representation of the screen area. The screen capture tool can provide portions of the screen area that do not require a BitBlt operation by copying a previously captured screen area or otherwise using pixel information in system memory (which is faster than a BitBlt operation). The screen capture tool may then update other portions of the screen area by BitBlt operation.

Additional features and advantages will be made apparent from the following detailed description of various embodiments that proceeds with reference to the accompanying drawings.

BRIEF DESCRIPTION OF THE DRAWINGS

FIGS. 1*a*-1*c* are captured screen areas of a computer desktop environment according to the prior art.

FIG. 2 is a diagram illustrating the bottleneck between system memory and a display card frame buffer in a computer system according to the prior art.

FIG. 3 is a block diagram of a suitable computing environment in which described embodiments may be implemented.

FIGS. 12*a*-12*c* are a code listing illustrating aspects of a rule set for organizing and combining operations in a screen capture operation list.

DETAILED DESCRIPTION

Figure 4:
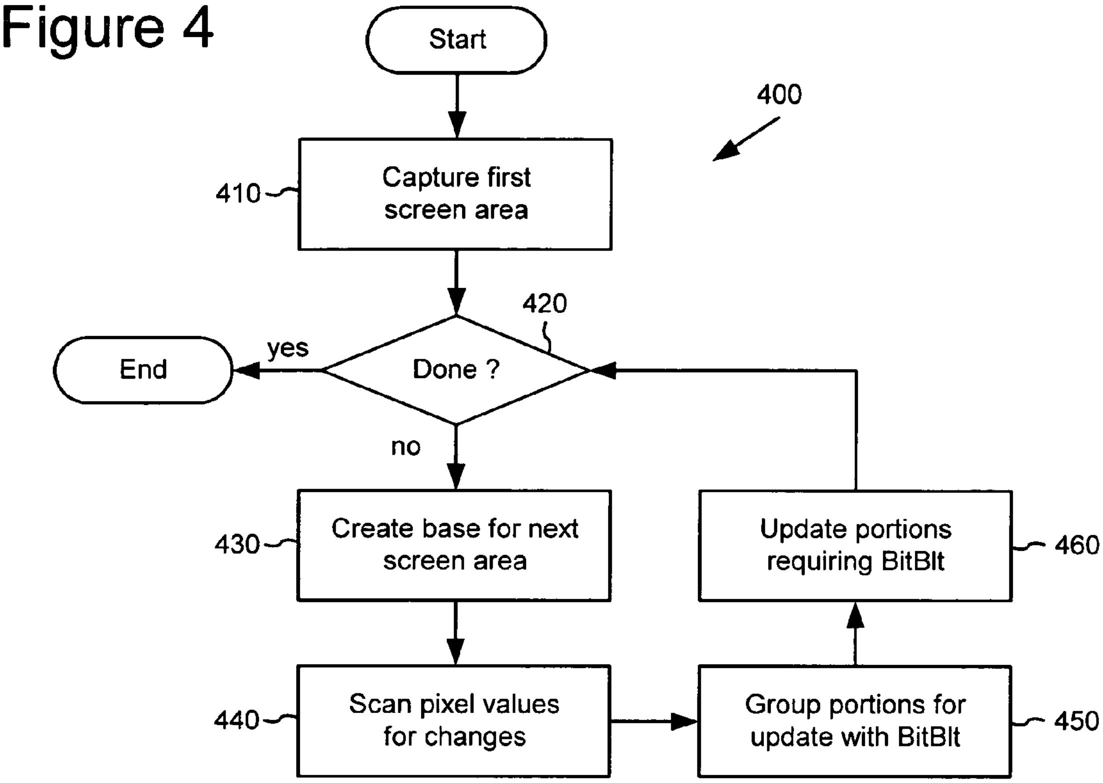
FIGS. 4 and 5*a*-5*c* are flowcharts illustrating techniques for reducing BitBlt usage by scanning for pixel value changes in a captured screen area.

Described embodiments are directed to reducing or even eliminating Bit Block Transfer ["BitBlt"] usage by a screen capture tool. In a wide variety of screen capture scenarios, this dramatically improves performance by decreasing the amount of pixel information transferred across the bottleneck between a display card frame buffer and system memory of a computer system. This performance gain enables screen capture at higher resolutions and frame rates, and even allows screen capture on low-end computer systems where it was not feasible before.

An entire screen area rarely changes every frame. Instead, screen areas are fairly static, and there is no need to capture the entire screen area at every frame. Accordingly, in described embodiments, a screen capture tool identifies changes in screen content that require transfers from a display card frame buffer to system memory. At the same time, the screen capture tool prioritizes transfers within system memory, for example, use of pixel information from a previously captured screen area for a current screen area.

In the described embodiments, a screen capture tool uses BitBlt operations to transfer pixel information from a display card frame buffer to system memory in a computer system with a display card. In alternative embodiments, the screen capture tool uses another operation to retrieve the pixel information for a screen area and/or operates in another environment. Indeed, the screen capture techniques of the present invention are not limited to a particular operating system, computing platform, software tool, or hardware device.

I. Computing Environment

FIG. 3 illustrates a generalized example of a suitable computing environment (300) in which described embodiments may be implemented. The computing environment (300) is not intended to suggest any limitation as to scope of use or functionality of the invention, as the present invention may be implemented in diverse general-purpose or special-purpose computing environments.

With reference to FIG. 3, the computing environment (300) includes at least one processing unit (310), memory (320), and a display card (330). The processing unit (310) executes computer-executable instructions and may be a real or a virtual processor. In a multi-processing system, multiple processing units execute computer- executable instructions to increase processing power. The memory (320) may be volatile memory (e.g., registers, cache, RAM), non-volatile memory (e.g., ROM, EEPROM, flash memory, etc.), or some combination of the two. The memory (320) stores software (380) implementing a screen capture tool with reduced BitBlt usage.

The display card (330) (alternatively called the video card, graphics card, graphics output device, display adapter, video graphics adapter, etc.) delivers output to a visual display unit such as a computer monitor. The display card (330) includes a frame buffer that stores pixel information for display on a screen. The frame buffer is often some type of RAM on the display card (330), but can instead be some other kind of memory and/or not physically located on the display card itself. The display card (330) can include a graphics processor, graphics accelerator, and/or other specialized display hardware.

Typically, operating system software (not shown) provides an operating environment for other software executing in the computing environment (300), and coordinates activities of the components of the computing environment (300). In addition, display driver software allows access to various features of the display card (330). The display driver software can work in conjunction with one or more layers of operating system software through which access to the features of the display card (330) is exposed. In particular, the display driver software and operating system software support a BitBlt operation, which is typically a relatively slow operation. Several factors can contribute to the latency of a BitBlt operation, including pixel format conversion in the display card as well as transfer latency between the display card and system memory. The latency is usually much less for a single pixel than for a large rectangle, but the relationship between number of pixels and latency is not exactly linear or monotonic. In one implementation, the display card frame buffer is organized pixel-by-pixel across a row and row-by-row from top to bottom according to a raster pattern. For this frame buffer organization, retrieving an entire row of pixels by BitBlt operation is about as fast as retrieving a small block spanning several rows, and the least efficient BitBlt operation retrieves a narrow (few columns) but tall (many rows) rectangle. In other implementations, the frame buffer organization and/or relative BitBlt operation latencies are different.

A computing environment may have additional features. For example, the computing environment (300) includes storage (340), one or more input devices (350), one or more output devices (360), and one or more communication connections (370). An interconnection mechanism (not shown) such as a bus, controller, or network interconnects the components of the computing environment (300).

The storage (340) may be removable or non-removable, and includes magnetic disks, magnetic tapes or cassettes, CD-ROMs, CD-RWs, DVDs, or any other medium which can be used to store information and which can be accessed within the computing environment (300). The storage (340) stores instructions for the software (380) implementing a screen capture tool with reduced BitBlt usage.

The input device(s) (350) may be a touch input device such as a keyboard, mouse, pen, or trackball, a voice input device, a scanning device, sound card, TV tuner/video input card, or other device that provides input to the computing environment (300).

The output device(s) (360) may be a visual display unit, printer, speaker, CD-writer, or other device that provides output from the computing environment (300). A visual display unit presents screen content based upon output delivered from the display card (330). For example, the visual display unit can be a standard computer monitor for which screen content is refreshed on a pixel-by-pixel basis across a row, repeating row-by-row from top to bottom, refreshing the entire screen 60 or more times per second. More generally, the visual display unit can use other scan patterns and/or display technologies.

The communication connection(s) (370) enable communication over a communication medium to another computing entity. The communication medium conveys information such as computer-executable instructions, compressed captured screen area information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (300), computer-readable media include memory (320), storage (340), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various implementations. Computer-executable instructions for program modules may be executed within a local or distributed computing environment.

For the sake of presentation, the detailed description uses terms like “capture,” “construct,” “retrieve,” and “update” to describe computer operations in a computing environment. These terms are high-level abstractions for operations performed by a computer, and should not be confused with acts performed by a human being. The actual computer operations corresponding to these terms vary depending on implementation.

II. Screen Capture Tool

A screen capture tool captures screen content such as a desktop environment, application windows, a slideshow, and video, and (optionally) captures audio content as well. To reduce or even eliminate BitBlt usage when capturing a screen area, the screen capture tool uses pixel information already in system memory, for example, pixel information from a previously captured screen area. The screen capture tool then uses BitBlt operations to get pixel information only for selected regions of the new screen area.

The screen capture tool can be a standalone software application, a feature of a multimedia production package (e.g., video editing software, audio/video production kit), a plug-in, or some other form of software and/or hardware product. The screen capture tool typically lets a user set high-level options for a capture session (e.g., media sources and types, quality, resultant bit rate, and output stream or file location). The screen capture tool can also present low-level options to the user, such as frame rate, output resolution, time distortion (e.g., slow motion). The output of the screen capture tool can be saved to a file or streamed over a network.

The screen capture tool can include or be combined with a compression tool to reduce the bit rate of a series of captured screen areas. The compression tool can be a screen capture encoder (for lossless encoding) or a video encoder (for lossy, but lower bit rate encoding) selected from a group of available encoders.

In some cases, a captured screen area shows an entire screen, for example, an entire desktop environment. In other cases, the screen area shows a selected window or arbitrary region of the desktop environment. In general, a screen area depicts some or all of the screen content presented or prepared for presentation in a desktop environment or other graphical user interface for a computer system.

The frame rate for a series of captured screen areas may be fixed for the duration of the series, for example, according to a wizard-defined setting, user-specified setting, or the capabilities of the computing environment. Or, the frame rate may vary during screen capture for all or part of a screen area so as to increase temporal resolution when possible and decrease temporal resolution (even dropping frames) if necessary.

III. Reducing BitBlt Usage

A screen capture tool uses any of several techniques to reduce BitBlt usage in a wide variety of screen capture scenarios. Initially, the screen capture tool captures a first screen area of a series using a BitBlt operation to capture the entire screen area, which is relatively time-consuming. For the next screen area, the screen capture tool evaluates changes in screen content if any, for example, using one of techniques described below. After the evaluation, the area to be updated by BitBlt operation can be all, part, or none of the screen area, depending on whether the screen content has changed (and, potentially, whether the screen capture tool detects the changes).

The screen capture tool then constructs a representation of the screen area in system memory. For example, the screen capture tool provides portions of the screen area that do not require a BitBlt operation. This may involve copying or other use of pixel information already in system memory, which is faster than BitBit operations. The screen capture tool may also update portions of the screen area refreshed by BitBlt operation. The BitBlt operations are slow, but the performance overhead generally decreases as the amount of pixel information retrieved (e.g., the size of the rectangle) decreases, and performance is very good when screen content is static or mostly static. Periodically, the screen capture tool can capture an entire captured screen area by BitBlt operation, in case the screen capture tool misses a change in screen content.

In general, depending on implementation, the timing and order of operations in the techniques of the described embodiments can vary. In some implementations, the placement of conditional logic is rearranged, the use of counters and other variables is different than shown, and/or the ordering of various operations is switched.

A. Scanning Pixel Values of the Current Screen Area for Changes

A screen capture tool can reduce the area of a current screen area to be updated by BitBlt operation by scanning the pixel values in a display card frame buffer for the current screen area. When a scanned pixel value indicates a change relative to the previously captured screen area, the screen capture tool uses a BitBlt operation to get pixel information for a portion of the current screen area. Otherwise, the screen capture tool uses pixel information from the previously captured screen area.

1. Generalized Technique

FIG. 4 shows a generalized technique (400) for reducing BitBlt usage by scanning a display card frame buffer for changes in pixel values of a screen area. A screen capture tool initially captures (410) the first screen area of a series and determines (420) whether to capture another screen area or end. For the first captured screen area, the screen capture tool uses a BitBlt operation to capture the entire screen area.

The screen capture tool creates (430) a base for the next screen area. For example, the screen capture tool copies the previously captured screen area to use as a base for the screen area that follows it. Since this copying is between locations in system memory, it is much faster than a BitBlt operation.

Next, the screen capture tool scans (440) a subset of the pixel locations of the screen area in the display card frame buffer for changes in pixel values relative to the previously captured screen area. For example, for selected pixel locations, the screen capture tool retrieves pixel values by BitBlt or other operation and compares the retrieved pixel values with the pixel values at the selected locations in the previously captured screen area (or the copy used as the base captured screen area). With the BitBlt operation, the screen capture tool retrieves pixel information from the display card frame buffer and performs the comparison with information in system memory. Alternatively, the display card performs the comparison in memory of the display card and returns a result.

If the pixel value at a pixel location of the screen area has changed, a portion of the screen area including the pixel location is marked as requiring updating by BitBlt operation. The size and placement of the portions of the screen area, and the number and locations of pixel values scanned within each portion, depend on implementation. In a block-based implementation described below, the screen capture tool divides a screen area into blocks and checks one pixel location per block. The number and sizes of the blocks is fixed. In other implementations, the number and/or sizes of the portions are adjusted depending on the hardware capabilities or current performance of the computer system or to focus on areas expected to change. Smaller portions require more retrieval and comparison operations (because there are more intra-portion locations to scan), but can detect changes in screen content more quickly and result in more selective BitBlt operations at the portion level.

The screen capture tool optionally groups (450) portions of the screen area for updating with a collective BitBlt operation. A single, collective BitBlt operation can be more efficient overall (e.g., by reducing memory seeking and page file swapping) than a series of more precise BitBlt operations for smaller portions, even if some pixel information is unnecessarily retrieved. Moreover, in some cases, the grouping (450) can join adjacent portions for a BitBlt operation, where one of the portions has changing screen content but no change was detected. The grouping (450) can occur after or concurrently with the scanning (440).

The screen capture tool updates (460) the portions of the screen area to be refreshed by BitBlt operation from the display card frame buffer. The screen capture tool then determines (420) whether to capture another screen area or end.

2. Block-based Implementation

Figure 5A:
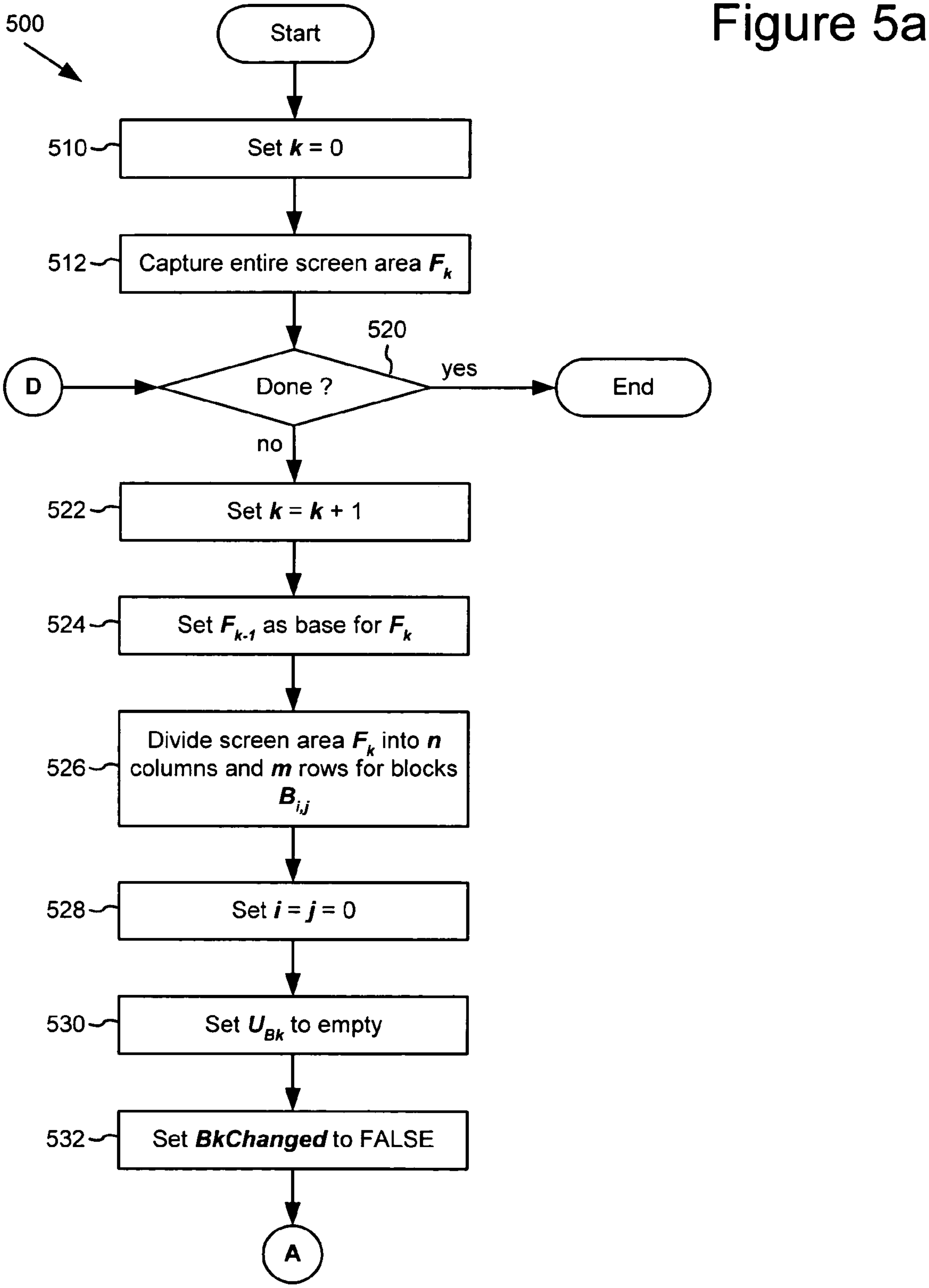
Figure 5B:
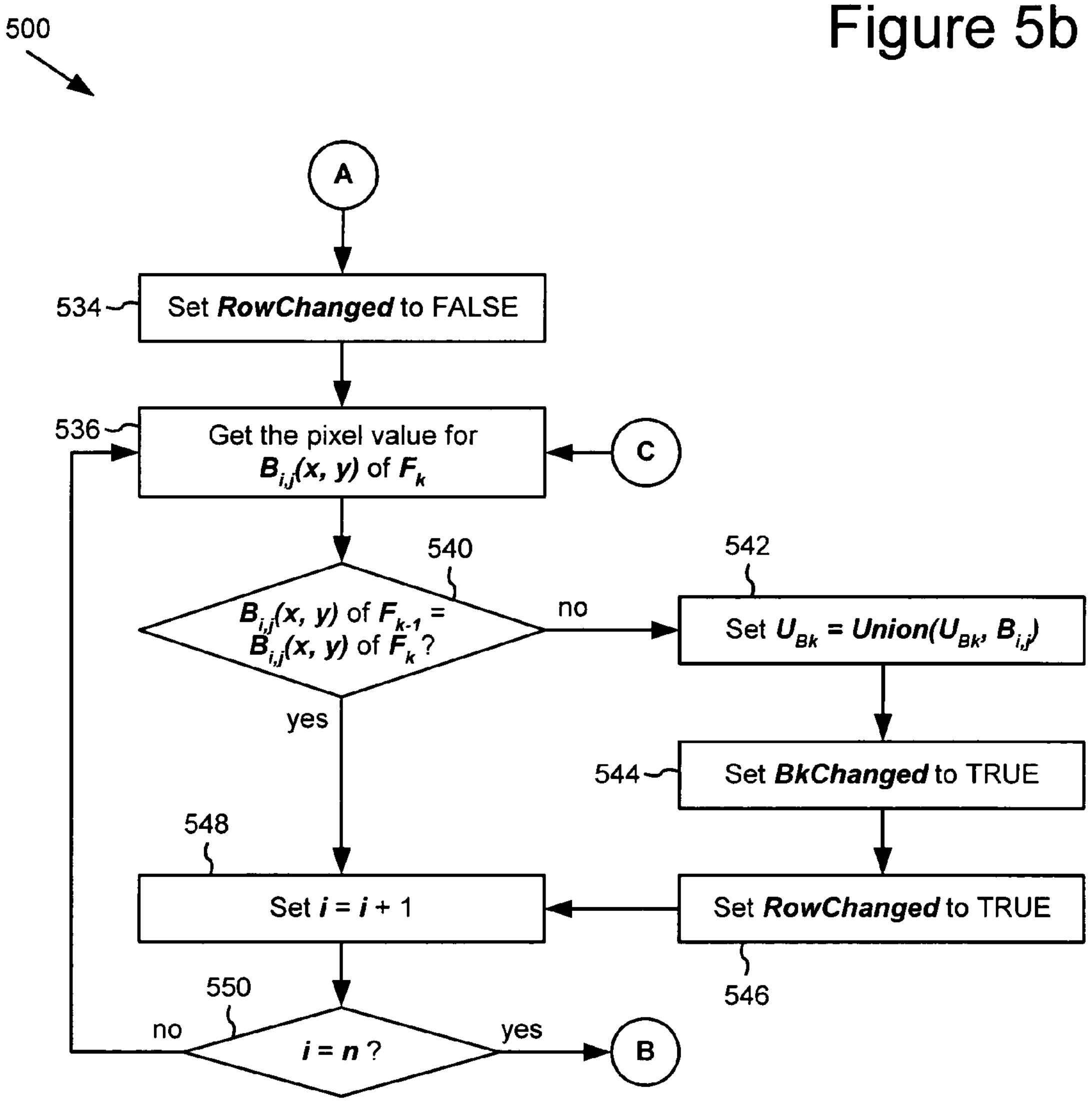
Figure 5C:
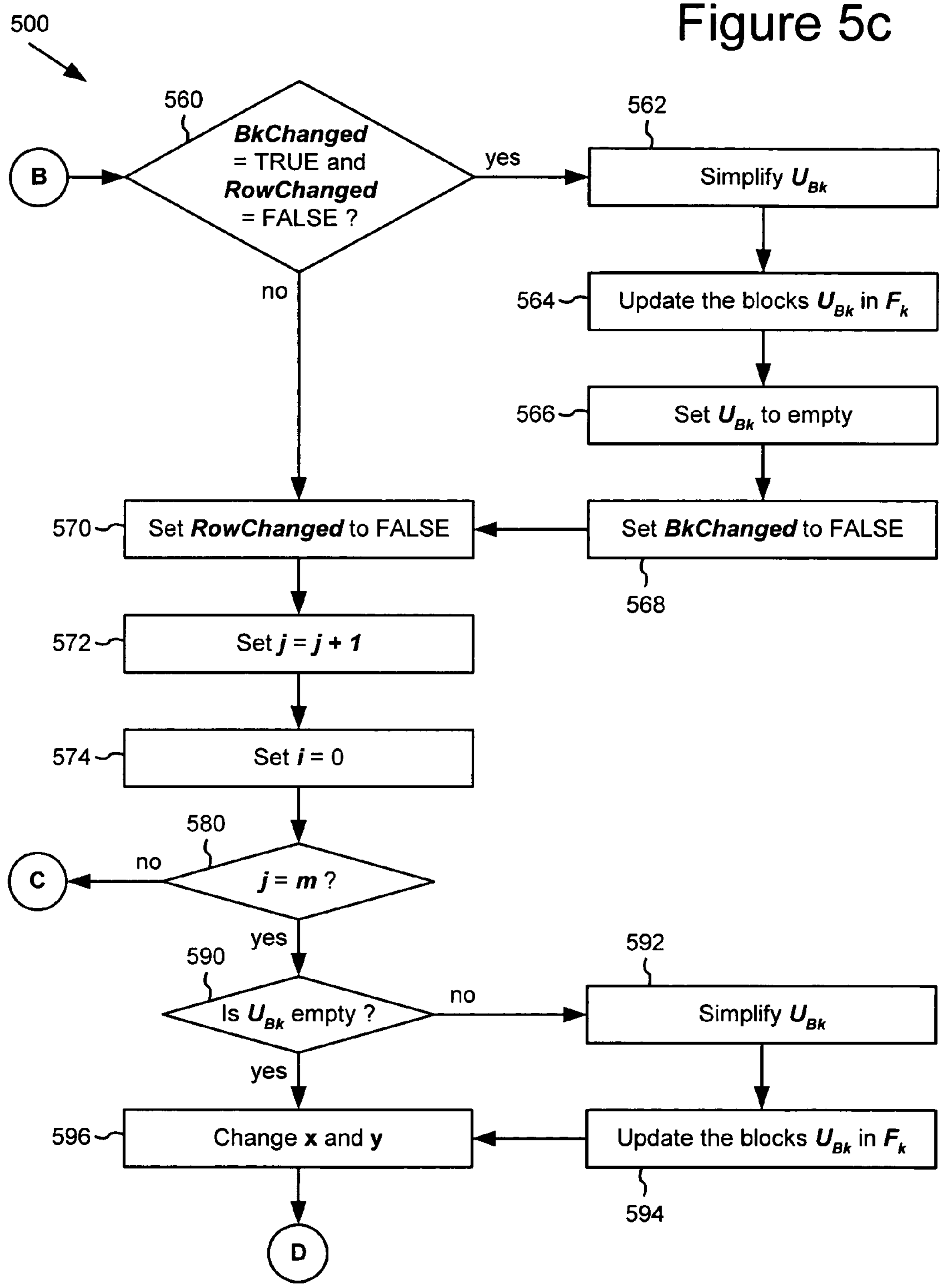

FIGS. 5*a*-5*c* show a detailed technique (500) for reducing BitBlt usage by scanning a display card frame buffer on a block-by-block basis for changes in pixel values of a rectangular screen area. Overall, the screen capture tool segments the screen area into blocks, retrieves pixel information for one or more sample pixel locations of each block, and compares the retrieved information to pixel information for corresponding pixel locations of the previous screen area. If a pixel value has changed at a sample pixel location in a block, the whole block is designated to be updated by BitBlt operation. From frame to frame, the screen capture tool changes which pixel locations within blocks are sampled to increase detection accuracy.

With reference to FIG. 5*a*, the screen capture tool sets (510) a frame counter k to 0 and captures (512) the entire screen area $F_k$ for the first frame of a series. The screen capture tool then determines (520) whether to capture another screen area or end.

When capturing a subsequent screen area, the screen capture tool increments (522) the frame counter k. Treating the subsequent screen area as the current screen area $F_k$, the screen capture tool sets (524) the previously captured screen area $F_{k-1}$ to be the base for the current screen area $F_k$, for example, copying the previously captured screen area $F_{k-1}$ in system memory. The screen capture tool divides (526) the current screen area $F_k$ into n columns and m rows to create blocks $B_{i,j}$ within the current screen area $F_k$, where $0 \leqq i < n$ and $0 \leqq j < m$, and where each block has width l×height p pixels. The screen capture tool initializes various counters and other variables, setting (528) column counter i and row counter j to zero and setting (530) a variable $U_{Bk}$ (the union of the blocks to be updated by BitBlt operation) to empty. The screen capture tool also sets (532, 534) the variables BkChanged and RowChanged to FALSE. BkChanged tracks whether a block has changed since the last BitBlt operation. RowChanged tracks whether a block of a row has changed.

The screen capture tool then begins to scan pixel values of the current screen area $F_k$ for changes, checking pixels from left to right, top to bottom. With a BitBlt or other operation, the screen capture tool gets (536) the pixel value for a sample pixel at location (x,y) within a block $B_{i,j}$ of the current screen area $F_k$, where $0 \leqq x < l$ and $0 \leqq y < p$. The screen capture tool compares (540) the retrieved value for $B_{i,j}$ (x,y) of $F_k$ with the value for $B_{i,j}$ (x,y) of $F_{k-1}$ in system memory. If the values are different, the screen capture tool adds (542) $B_{i,j}$ to $U_{Bk}$, sets (544, 546) BkChanged and RowChanged to TRUE, and increments (548) the column counter i. If the values are the same, the screen capture tool just increments (548) the column counter i.

The screen capture tool determines (550) whether the end of the row has been reached and, if not, repeats for the next block in the row. One pixel location per block is scanned and the same location (x,y) is scanned within each block of a screen area. Alternatively, the screen capture tool scans more than one location per block and/or different locations in different blocks of a screen area.

Figure 6:
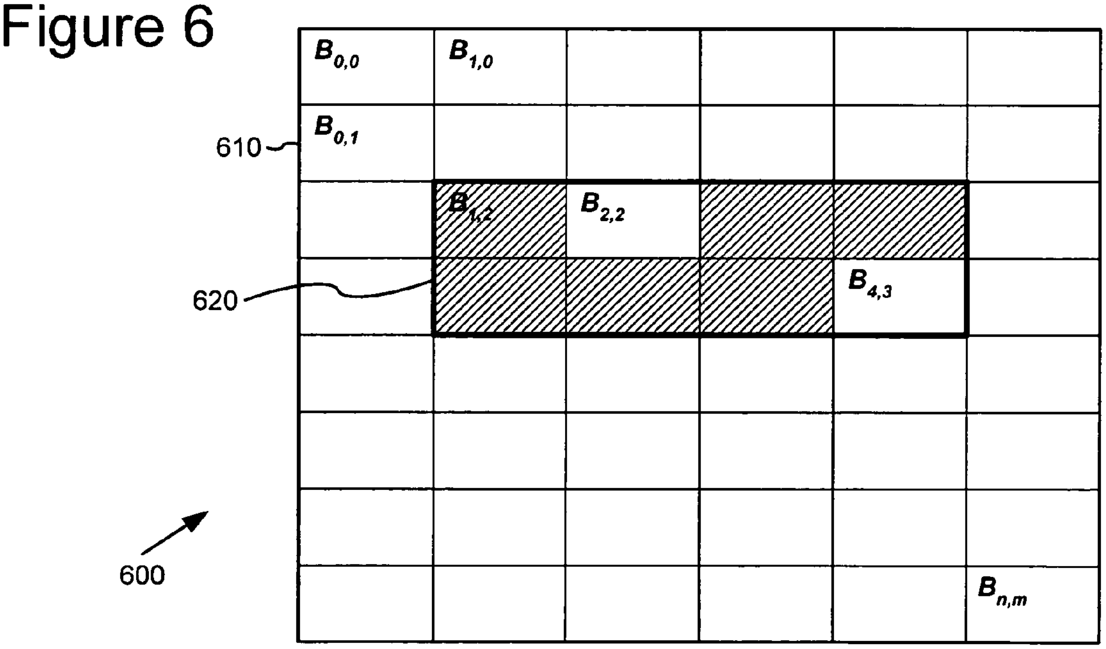
FIG. 6 is a diagram illustrating grouping of blocks of a captured screen area for updating by BitBlt operation.

When the end of the row is reached, the screen capture tool determines (560) whether a block has changed since the last block BitBlt operation and the changed block was not in the row just checked. If so, the screen capture tool prepares for a BitBlt operation. Specifically, the screen capture tool simplifies (562) $U_{Bk}$ and updates (564) the blocks of $U_{Bk}$ by BitBlt operation. This can be more efficient than piecemeal, block-by-block BitBlt operations for the individual blocks in $U_{Bk}$. For example, FIG. 6 shows a captured screen area (600) divided into blocks such as block $B_{0,1}$, (610). Pixel value changes were detected in the hash-marked blocks such as $B_{1,2}$. When the screen capture tool reaches the end of the fifth row of blocks of the screen area (600), BkChanged is TRUE and RowChanged is FALSE. In other words, at least one block requires updating by BitBlt operation, but no such blocks were in the last row checked. Having established the bottom boundary, the screen capture tool sets the rectangle (620) enclosing the blocks to be updated by a collective BitBlt operation, including $B_{2,2}$ and $B_{4,3}$ in $U_{Bk}$ even though changes were not initially detected in those blocks. Alternatively, the screen capture tool simplifies (562) $U_{Bk}$ in some other way (e.g., grouping contiguous blocks into rectangles, but not adding blocks to the union), simplifies $U_{Bk}$ concurrently with the scanning and addition of blocks to $U_{Bk}$, or performs no simplification of $U_{Bk}$.

This row-by-row update check corresponds to the row-by-row raster pattern organization and relative latencies in conventional display card frame buffers—no update by BitBlt operation occurs for a row of blocks as long as a subsequent, contiguous row might require updating by BitBlt operation. Alternative embodiments check other update conditions After the updating (564), the screen capture tool sets (566) $U_{Bk}$ to empty and sets (568) BkChanged to FALSE, resetting the variables.

The screen capture tool then prepares to check the next row of the current screen area $F_k$. Specifically, the screen capture tool resets (570) RowChanged to FALSE, increments (572) the row counter j, and resets (574) the column counter i.

The screen capture tool determines (580) whether the last row in the current screen area $F_k$ has been checked and, if not, repeats for the next row in the current screen area $F_k$. If the last row in the current screen area $F_k$ has been checked, the screen capture tool determines (590) whether $U_{Bk}$ is empty. ($U_{Bk}$ can be non-empty when a block changes in the bottom row of the current screen area $F_k$.) If so, the screen capture tool simplifies (592) $U_{Bk}$ and updates (594) the blocks of $U_{Bk}$ with a BitBlt operation, as described above.

Before continuing, the screen capture tool changes (596) the pixel location values x and y, which improves the chances the screen capture tool will detect changes in screen content. For example, x and y start at 0, and x is incremented from frame to frame until the end l of the pixel row is reached. At that point, y is incremented and x is reset to 0. This continues for p pixel rows, after which x and y are reset to 0. So, every pixel location in a block is used as a sample every l×p frames. Alternatively, x and y are changed in some other deterministic or random way every frame or on some other basis.

B. Analyzing Display Driver Commands

Instead of scanning pixel values in a display card frame buffer, a screen capture tool can analyze display driver commands and determine regions (e.g., rectangles) of a current screen area that are affected by the commands. Organizing and combining the regions, the screen capture tool maintains a list of operations for the screen capture tool. Following the list of operations, the screen capture tool constructs a representation the current screen area in system memory using pixel information from the previously captured screen area, system-provided bitmaps for the cursor or other features, and/or BitBlt operations retrieving pixel information from a display card frame buffer. In common capture scenarios, this dramatically reduces or even eliminates BitBlt usage for most captured screen areas.

1. Generalized Technique

Figure 7:
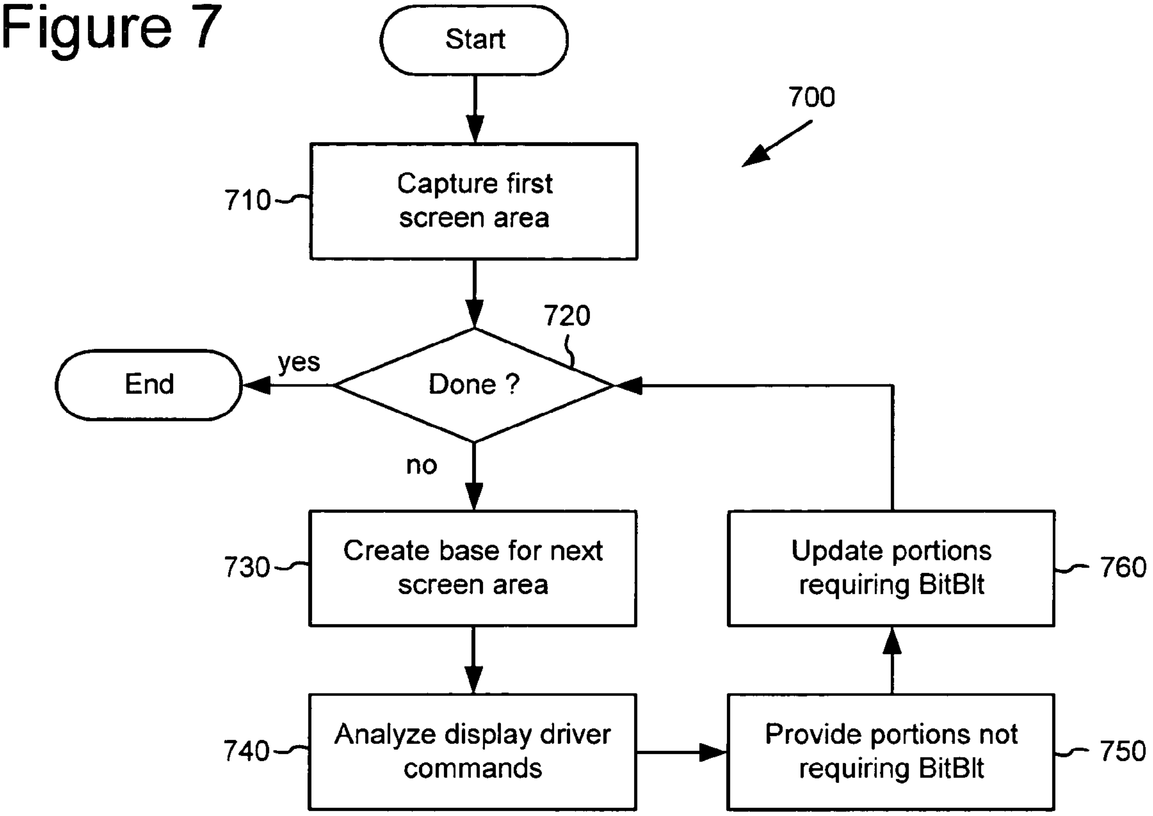
FIG. 7 is a flowchart illustrating a technique for reducing BitBlt usage based upon analysis of display driver commands.

FIG. 7 shows a generalized technique (700) for reducing BitBlt usage in a screen capture tool based upon analysis of display driver commands. A screen capture tool initially captures (710) the first screen area of a series and determines (720) whether to capture another screen area or end. For the first screen area, the screen capture tool uses a BitBlt operation to capture the entire screen area.

The screen capture tool then creates (730) a base for the next screen area. For example, the screen capture tool copies the previously captured screen area to use as a base for the screen area that follows it. Since this copying is between locations in system memory, it is much faster than a BitBlt operation.

Next, the screen capture tool analyzes (740) display driver commands, determining regions (e.g., areas of rectangular or other configuration) of the screen area affected by the commands and maintaining a list of operations for the screen capture tool to perform. For example, the screen capture tool analyzes display driver commands and creates and processes the list within the framework of the software architecture (800) of FIG. 8. Alternatively, the screen capture tool operates according to other software architectures, for example, those having a different number of software layers and/or different protocol for exchanging display-related information.

The screen capture tool provides (750) portions of the current screen area that do not require a BitBlt operation. For example, the screen capture tool moves regions of pixels within the base for the current screen area to account for movement relative to the previously captured screen area. Or, the screen capture tool changes the position or shape of the cursor for the current screen area. These operations are relatively fast, as they involve transfers within system memory or assembly of the representation of the current screen area from parameterized pixel information (not BitBlt operations) derived from the display driver commands. In some implementations, the screen capture tool may also add text to the current screen area based upon parameterized pixel information derived from the display driver commands. The screen capture tool updates (760) portions of the current screen area refreshed by BitBlt operations from the display card frame buffer, and then determines (720) whether to capture another screen area or end.

2. Software Architecture

Figure 8:
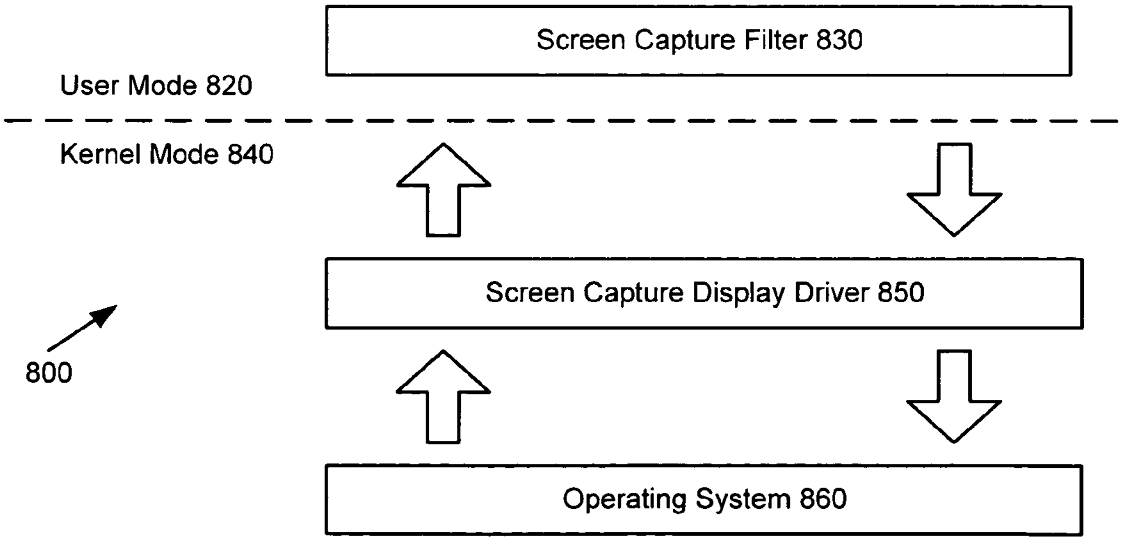
FIG. 8 is a block diagram of a software architecture including a screen capture display driver and a screen capture filter.

FIG. 8 shows a software architecture (800) including an operating system (860) and program modules for a screen capture tool.

The operating system (860) (running in kernel mode (840)) receives instructions from other software (e.g., application programs) and sends drawing commands to display drivers loaded in the system, including the primary display driver (not shown) for the display card and the screen capture display driver (850). The drawing commands relate to drawing lines, shapes, bitmaps, the cursor, text, etc. The details of the operating system (860) and display driver interfaces depend on implementation. In one implementation, the operating system (860) translates instructions into device-independent commands that are sent to the display drivers.

The primary display driver receives the drawing commands and translates them into commands and actions for the display card or another component (e.g., a device-independent drawing engine), which will result in the drawing of graphics on a visual display unit. The primary display driver may provide information such as display card capabilities to the operating system (860) and request additional information from the operating system (860) as needed. Primary display drivers can vary from display card to display card and operating system to operating system. For a given operating system, every display driver typically must implement some minimum functionality to interoperate. This might be a minimum set of commands that the operating system calls to draw simple lines, move/copy rectangular bitmaps, draw text, and draw/move a cursor. A primary display driver can implement additional functionality, or the operating system can convert more complex operations to the minimum level of interoperability.

The screen capture display driver (850) also receives the drawing commands sent from the operating system (860), but the screen capture display driver (850) is used to make screen capture more efficient, not to change the display according to the commands. The screen capture display driver (850) determines regions affected by the commands and translates the commands into operations for the screen capture filter (830) to follow to construct the representation of the current screen area. For example, the operations indicate regions within a screen area to move or update. The screen capture display driver (850) maintains a list of the screen capture operations, assimilating new operations into the list according to a rule set described below.

Some commands received by the screen capture display driver (850) include parameterized display information, which uses fewer bits than raw bitmap information. For example, some commands indicate cursor position and/or cursor shape. Bitmap information for the cursor shape can be sent once from the operating system (860) to a display driver, be sent when the shape changes, or be pre-loaded. Text-related information can also be parameterized rather than sent as bitmaps. A drawback is that interpreting parameterized information and correctly displaying the desired result can be complex, especially for text due to the variety of fonts, presentation styles, and other factors. Accordingly, in some implementations, the screen capture display driver (850) recognizes parameterized information for cursor positions and shapes, but uses bitmaps acquired by BitBlt operation for text.

The screen capture filter (830) (running in user mode (820)) is a high-level program module, which can work with other filters that perform functions such as compression, multiplexing output, streaming, or writing to a file. When constructing the representation of the current screen area, the screen capture filter (830) gets the list of screen capture operations from the screen capture display driver (850). The screen capture device driver (850) may also send other information such as the cursor shape or text to be displayed, or region parameters. Based on the list of operations, the screen capture filter (830) constructs the representation of the current screen area starting from the base for the current screen area. For example, the screen capture filter (830) moves regions around to compensate for movement relative to the previously captured screen area or obtains new cursor shape information. The screen capture filter (830) may also retrieve pixel information from the display card frame buffer using BitBlt operations, for example, to fill a region that has been updated or left exposed after a move operation.

3. Screen Capture Display Driver Timing

Figure 9:
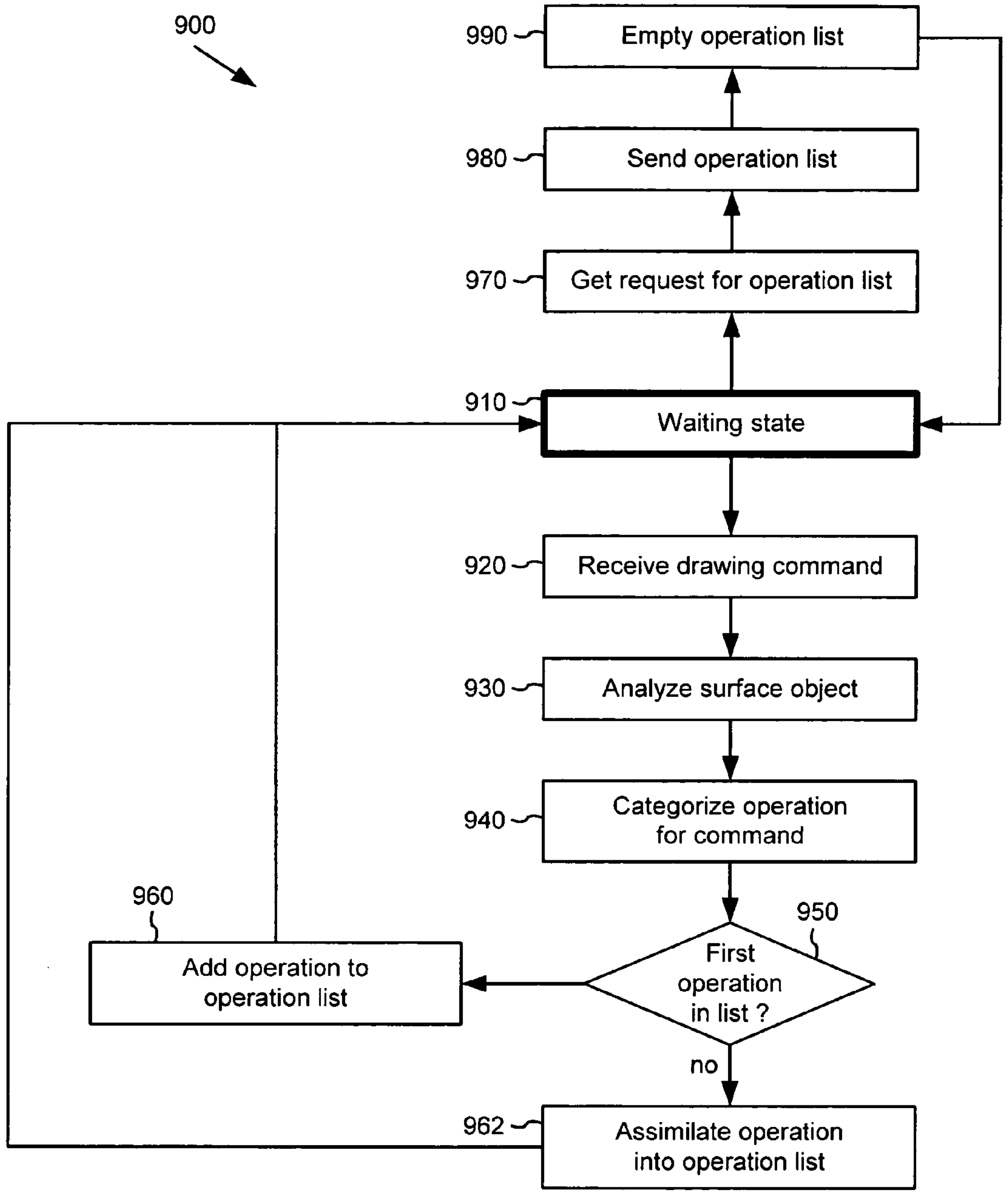
FIG. 9 is a state diagram for a screen capture display driver.

FIG. 9 shows a state diagram (900) for a screen capture display driver. The state diagram (900) shows the timing by which the screen capture display driver receives and processes drawing commands to build an operation list, which is periodically sent to a screen capture filter to construct the representation of a screen area. Although FIG. 9 shows activities of the screen capture display driver, alternatively, other program modules of a screen capture tool perform some or all of the activities.

In a waiting state (910), the screen capture display driver waits to receive a drawing command from the operating system or a request for the operation list for the current screen area. After processing a drawing command or request for the operation list, the screen capture display driver returns to the waiting state (910).

When the screen capture display driver receives (920) a drawing command, the screen capture display driver analyzes (930) the surface object or other representation of the screen area. For example, for commands that affect the drawing of a current screen area, the screen capture display driver analyzes some representation for the base for the current screen area.

The screen capture display driver categorizes (940) the drawing command as an operation recognized by the screen capture tool. An operating system and display drivers can use dozens of different commands to specify the drawing of lines, shapes, fill patterns, bitmaps, text, cursors, etc. Depending on the operating system and display driver, the number and implementations of such commands can vary. Rather than address the full complexity of display driver logic, the screen capture display driver classifies drawing commands according to simplified categories recognized by the screen capture tool. These categories include move, copy (refresh), cursor position, cursor shape, and (optionally) text display operations. In alternative embodiments, the screen capture display driver uses more or fewer operations to categorize the drawing commands, or directly -uses some or all of the drawing commands and information to construct the representation of the current screen area.

The screen capture display driver determines (950) whether the operation is the first operation in the list for the current screen area. If so, the screen capture display driver adds (960) the operation to the list. If not, the screen capture display driver assimilates (962) the operation into the operation list using a rule set that, in general, seeks to reduce the number of operations in the list, reduce BitBlt usage, and reduce memory seeking/page file swapping and the overall number of bits moved within system memory and the frame buffer. In one implementation, a stack data structure is used for the operation list, but other data structures may also be used. Usually, the operation list includes somewhere between one and several dozen operations, depending on the amount of change in screen content and the screen capture frame rate. After processing the drawing command as an operation in the operation list, the screen capture display driver returns to the waiting state (910).

From time to time, the screen capture display driver gets (970) a request for the operation list from the screen capture filter and sends (980) the operation list to the screen capture filter along with other information (e.g., cursor shape, text) used by the screen capture filter. For example, this occurs after the screen capture filter copies the previously captured screen area to use as a base for a current screen area, repeating at the frame rate for the series. The screen capture filter then processes the operation list to construct the representation of the current screen area. After sending (980) the operation list for the current screen area, the screen capture display driver empties (990) the operation list and returns to the waiting state (910).

4. Assimilating Drawing Commands into an Operation List

The screen capture display driver uses a set of rules to organize and combine the regions affected by drawing operations, as specified by operations in an operation list. Two primary goals of the rule set are to reduce the number of operations in the operation list and reduce BitBlt usage. Other goals are to reduce memory seeking/page file swapping and the overall number of bits moved within system memory and the frame buffer. By using a relatively small set of operations, the screen capture display driver simplifies management of the operation list. The screen capture display driver streamlines the operation list by removing or combining operations that are redundant, unnecessary, or superseded by the time the current screen area is captured. This in turn makes the construction process for the current screen area more efficient.

Figure 10:
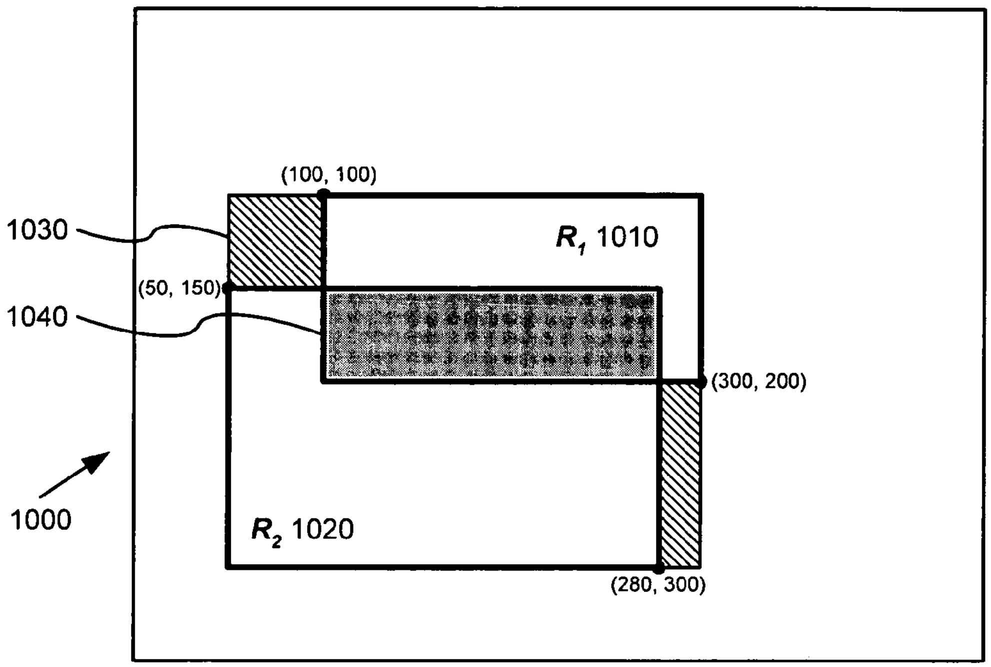
FIGS. 10 and 11 are diagrams illustrating rules for organizing and combining operations in a screen capture operation list.
Figure 11:
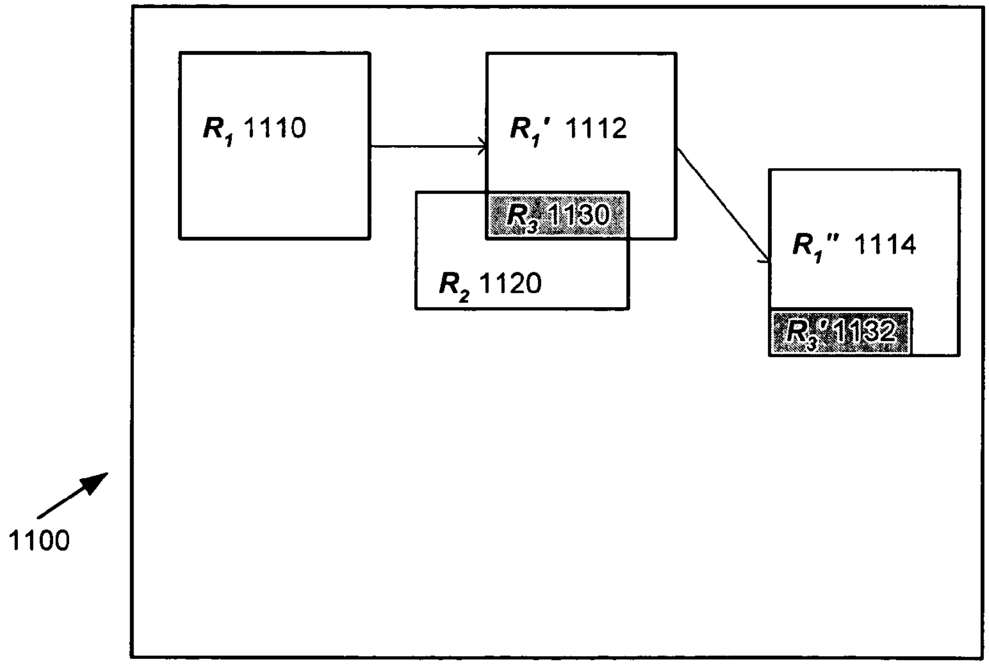

FIGS. 10 and 11 are diagrams illustrating two rules of a rule set in one implementation. FIGS. 12*a*-12*c* show a code listing for the rule set in the implementation. The rule set incorporates various heuristics judgments. In alternative embodiments, the screen capture tool incorporates different heuristic judgments in the rule set, uses another rule set, and/or uses another technique to organize and combine screen capture operations. The other rule set can be from a field other than screen capture, for example, terminal services or remote user interface presentation.

FIG. 10 illustrates one of the simpler rules in the rule set. The screen capture display driver receives a drawing command for a rectangle $R_1$ (1010) located at position (100, 100, 300, 200) of a screen area (1000). The screen capture display driver converts the command to a copy operation and stores the operation in the operation list. The screen capture display driver then receives a drawing command for a rectangle $R_2$ (1020) located at position (50, 150, 280, 300) and converts the second drawing command to a second copy operation. A BitBlt operation could be performed for each of the copy operations, but the intersection (1040) of the rectangles $R_1$ and $R_2$ would be refreshed twice by BitBlt operation. Accordingly, the screen capture display driver analyzes the efficiency of merging the rectangles $R_1$ and $R_2$ into a single rectangle located at position (50, 100, 300, 300). The screen capture display driver merges the rectangles $R_1$ and $R_2$ if the area of the intersection (1040) is greater than or equal to the area (1030) (shown with hatch marks) added by the merging. In FIG. 10, the area of the intersection (1040) is 180×50=9000 pixels and the added area (1030) is (50×50)+(20×100)=4500 pixels, so the screen capture display driver merges the rectangles $R_1$ and $R_2$.

FIG. 11 illustrates a more complex rule in the rule set. The screen capture display driver receives a drawing command for a rectangle $R_1$ (1110) of a screen area (1100). The screen capture display driver converts the-command to a move operation (moving $R_1$ (1110) to $R_1$' (1112)). The screen capture display driver then receives a drawing command for a rectangle $R_2$ (1120) and converts the command to a copy operation (updating $R_2$ (1120)). Next, the screen capture display driver receives a drawing command corresponding to a second move operation (moving $R_1$' (1112) to $R_1$" (1114)). At this point, the operation list is:

1. Move $R_1$ to $R_1$'.
2. Update $R_2$.
3. Move $R_1$' to $R_1$".

The operation list includes a first move operation (moving $R_1$ (1110) to $R_1$' (1112)) that will be superseded by a subsequent move operation (moving $R_1$' (1112) to $R_1$" (1114)). At the same time, part of $R_1$' (1112) (shown as the intersection $R_3$ (1130)) is overlapped when $R_2$ (1120) is updated. Accordingly, the screen capture display driver simplifies the operation list as follows:

1. Move $R_1$ to $R_1$".
2. Update $R_2$.
3. Move $R_3$ to $R_3$', where $R_3$' (1132) is the position of $R_3$ in $R_1$".

With the simplified operation list, the number of pixels moved within system memory is decreased. The amount of space left behind after the move operations, which may require updating by BitBlt operation, is also decreased.

FIGS. 12*a*-12*c* are a code listing (1200) illustrating aspects of the rule set. When a screen capture display driver processes drawing commands, the function GetProcessCommand( ) shown in the code listing (1200) is called.

A screen capture display driver converts a drawing command into a copy or move operation. The screen capture display driver adds the new operation to the operation list (if it is the first operation) or assimilates the new operation into the list according to the rule set. To assimilate the new operation into the list, the screen capture display driver-compares the new operation to an operation already in the list, starting with the oldest operation in the list. (A stack data structure orders the operations in the list.) Specifically, the screen capture display driver determines the rectangular region affected by the new operation and the rectangular region affected by the operation in the list, and then determines the relation between the rectangular regions. The input parameters for GetProcessCommand( ) are the operation type for the new operation, the operation type for the operation in the list, and the relation between the rectangular regions. The function GetProcessCommand( ) returns one or more processing commands. A processing command (described in detail below) might direct the screen capture display driver to do nothing with the new operation, continue by comparing the new operation with the next oldest operation in the list, merge the two rectangular regions, or perform some other action.

For the operations, an enumerated data type enumCommandType has a value of 0 for commandCopyBuffer (i.e., copy operation) or 1 for commandMoveBuffer (i.e., move operation). For a copy operation, the affected region is the rectangle to be updated by the copy operation. If the new operation is a move operation, the affected region is the source rectangle for the move (e.g., $R_1$ for the operation Move $R_1$ to $R_1$'). On the other hand, if the operation in the list is a move operation, the affected region is the destination rectangle for the move (e.g., $R_1$' for the operation Move $R_1$ to $R_1$').

Table 2 explains the different relations between the affected rectangles. The affected rectangle for the new operation is Rect1 and the affected rectangle for the operation in the list is Rect2.

| Relation | Meaning |
|---|---|
| rrRect1EqualRect2 | The affected rectangles are the same in position and area. |
| rrRect1IncludedinRect2 | No part of Rect1 is outside of Rect2. |
| rrRect2IncludedinRect1 | No part of Rect2 is outside of Rect1. |
| rrNewUnionAreaLess-ThanIntArea | Rect1 and Rect2 intersect, and the area of the intersection is greater than the area that would be added by merging Rect1 and Rect2. See FIG. 10. |
| rrAdjacent | Rect1 and Rect2 share a common side. Another definition could be: AreaOf(Rect1) + AreaOf(Rect2) = AreaOf(Rect1 Union Rect2) where Union is defined as the smallest rectangle that contains both Rect1 and Rect2. |
| rrNoIntersection | Rect1 and Rect2 do not intersect, or the relationship falls into no other category. |

Table 2. Relations between affected rectangles.

In the function GetProcessCommand( ), the input parameters are converted to an index value nTableIndex between 0 and 19 for the array stcRectProcessCmd[ ]. The value of nTableIndex depends on the relation between affected rectangles (see the if-then-else statement) and also on the operation types for the new operation and operation in the list (see the nTableIndex+= . . . statement).

One or more processing commands for the element at nTableIndex in the array stcRectProcessCmd[ ] are then retrieved and returned. Each element of the array includes one or more processing commands (see fourth column). For the sake of illustration, the code listing (1200) also shows for each element the associated combination of operation types (see first and second columns) and affected rectangle relation (see third column).

Table 3 explains the different processing commands.

| Processing Command | Meaning |
|---|---|
| erpcNoActionStopScanning | Stop comparing the new operation with operations in the stack; no need to insert the new operation in the stack. |
| erpcMergeCopyBuffer | Merge the two rectangles into one inclusive rectangle for a copy operation if a merging condition satisfied as described in connection with FIG. 10; stop comparing the new operation with operations in the stack. |
| erpcNoActionNextElement | Do nothing for this comparison; continue comparing the new operation with operations in the stack, starting with the next operation in the stack. |
| erpcMergeIfRect1Is-HalfBigger | Merge the two rectangles into one inclusive rectangle for a copy operation if the area of Rect1 is at least 50% of the area of Rect2. |

-continued

| Processing Command | Meaning |
|---|---|
| erpcCheckIntersection-WithSource | Check whether Rect1 has an intersection with Rect2 after execution of other processing command; if there is an intersection, track intersection for potential later consideration as described in connection with FIG. 11. |
| erpcMergeCopyBufferIf-IntersectisBig | Merge the two rectangles into one inclusive rectangle for a copy operation if the area of the intersection between Rect1 and Rect2 is at least 50% of the area of Rect2. |
| erpcConsiderRect-Source | Consider the two rectangles as described in connection with FIG. 11. For instance, if the destination rectangle for the operation in the list equals the source rectangle for the new operation, a single command suffices. |

Table 3. Processing commands.

For instance, suppose the operation list includes one operation, a commandCopyBuffer for an entire 1024×768 pixel screen area. The affected rectangle is (0, 0, 1024, 768). The screen capture display driver converts a second drawing command into a new operation, which is a commandCopyBuffer that affects the rectangle (100, 100, 200, 200). The relation between the two rectangles is rrRect1IncludedInRect2, since (100, 100, 200, 200) is included in (0, 0, 1024, 768). Thus, when the function GetProcessCommand( ) is called, the value of nTableIndex is 1+(0·10)+(0·5)=1, and the processing command erpcNoActionStopScanning in the second element of stcRectProcessCmd[ ] is returned.

IV. Results

The results of screen capture according to the described embodiments show marked improvement over full screen capture techniques and consistently good performance in a wide variety of screen capture scenarios. This performance gain reduces annoying effects such as mouse cursor freezing and even permits doing general-purpose screen capture with excellent results on low-end computers where it was not feasible before.

With a screen capture tool that reduces BitBlt usage by scanning the pixel values of a current screen area for changes, the screen capture tool typically uses 50% less processor cycles than full screen capture techniques. For example, in a computer system with a 450 MHz processor and an ATI 3D Rage Pro AGP 2x card, the processor cycle gain was about 50%. In a computer system with dual 1 GHz processors and an ATI Rage 128 Pro, capturing a 800×600×24 bit frame takes 100 ms, allowing capture at 10 fps. In contrast, screen capture of the same frame in the same system with full screen capture techniques takes 300 ms, and screen capture at 10 fps is not possible.

With a screen capture tool that reduces BitBlt usage by analyzing display driver commands, the screen capture tool typically uses 70% less processor cycles than full screen capture techniques. In the computer system with dual 1 GHz processors, capturing a 800×600×24 bit frame takes 50 ms, allowing capture at 20 fps. In another test, the screen capture tool captured a series of 1280×1024×24 bit frames at 15 fps without slowdowns or mouse cursor freezing. In the same computer system, screen capture with full screen capture techniques showed slowdowns and mouse cursor freezing with 1024×768×24 bit frames at 2 fps.

With a screen capture tool that scans pixel values for changes, increasing the resolution of the captured screen area increases scanning time because more pixels are scanned every frame. Similarly, increasing the frame rate involves scanning more pixels overall. In contrast, with a screen capture tool that analyzes display driver commands, performance overhead does not automatically increase when resolution and frame rate increase.

Having described and illustrated the principles of my invention with reference to various described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A computer-readable medium storing in storage computer-executable instructions for causing a computer system programmed thereby to perform a method of capturing a screen area in display by a visual display unit, the method comprising:

based upon analysis of one or more display driver commands, determining for each of one or more regions of the screen area whether to provide the region with or without bit block transfers from a display card frame buffer, that buffers the screen area for display by the visual display unit that displays the screen area wherein each of the one or more display driver commands is a drawing command sent from an operating system and received by one or more display drivers, and wherein the analysis includes for a new display driver command of the one or more display driver commands:

converting the new display driver command into a new screen capture operation;

comparing new screen capture operation to one or more previous screen capture operations in a list, wherein the comparing includes:

identifying a first portion of the screen area that is affected by the new screen capture operation;

identifying a second portion of the screen area that is affected by a selected one of the previous screen capture operations in the list;

identifying a relation between the first portion of the screen area and the second portion of the screen area; and setting a first region of the one or more regions of the screen area based upon the relation between the first portion of the screen area and the second portion of the screen area; and depending on results of the comparing, selectively adding the new screen capture operation into the list while simplifying the list by removing or replacing at least one redundant operation among the one or more previous screen capture operations in the list; and constructing a representation of the screen area in system memory.

2. The computer-readable medium of claim 1 wherein the constructing includes capturing all of the screen area by bit block transfer from the display card frame buffer.

3. The computer-readable medium of claim 1 wherein the constructing includes providing all of the representation of the screen area without bit block transfers from the display card frame buffer for the screen area.

4. The computer-readable medium of claim 3 wherein the providing comprises using pre-determined screen feature pixel information.

5. The computer-readable medium of claim 3 wherein the providing comprises copying a previous screen area representation in the system memory.

6. The computer-readable medium of claim 1 wherein the constructing includes providing at least some of the representation of the screen area without bit block transfers from the display card frame buffer and capturing at least some of the screen area by bit block transfer from the display card frame buffer.

7. The computer-readable medium of claim 6 wherein the providing comprises copying a previous screen area representation in the system memory and moving one or more regions of the copied previous screen area representation.

8. The computer-readable medium of claim 1 wherein the method further comprises:

capturing a first screen area in a series by bit block transfer from the display card frame buffer; and for each of at least one subsequent screen area in the series, performing the determining and the constructing.

9. The computer-readable medium of claim 1 wherein the new screen capture operation parameterizes cursor placement or shape for the screen area.

10. The computer-readable medium of claim 1 wherein the new screen capture operation parameterizes movement of previous screen area pixel information for the screen area.

11. The computer-readable medium of claim 1 wherein the screen area shows an entire screen, a window, or a user-specified area.

12. The computer-readable medium of claim 1 wherein the constructed representation comprises pixel values for pixel locations of the screen area.

13. The computer-readable medium of claim 12 wherein the method further comprises compressing the constructed representation into a reduced bit rate form.

14. The computer-readable medium of claim 13 wherein the compression includes lossy compression.

15. The computer-readable medium of claim 1 wherein the selectively updating is based upon one or more criteria that include reducing bit block transfers, reducing number of screen capture operations, and reducing memory page swapping.

16. The computer-readable medium of claim 1 wherein the new screen capture operation has one of plural types, the plural types including move commands, refresh commands, and cursor commands.

17. The computer-readable medium of claim 1 wherein a screen capture display driver receives the one or more display driver commands, and wherein the screen capture display driver is different than a primary display driver for the computer system that causes drawing upon the visual display unit.

18. The computer-readable medium of claim 1 wherein the drawing command for at least one of the one or more display driver commands is a simple line drawing command, a rectangular bitmap drawing command, a parameterized cursor drawing command, a parameterized shape drawing command, or a text drawing command.

19. The method of claim 1 wherein the comparing includes:

identifying a first portion of the screen area that is affected by the new screen capture operation;

identifying a second portion of the screen area that is affected by a selected one of the previous screen capture operations in the list;

identifying a relation between the first portion of the screen area and the second portion of the screen area; and setting a first region of the one or more regions of the screen area based upon the relation between the first portion of the screen area and the second portion of the screen area.

20. The method of claim 1 wherein the relation indicates intersection between the first portion and the second portion, wherein the first region includes the first portion and the second portion, and wherein the selectively adding includes adding a replacement screen capture operation to represent the new screen capture operation and the selected previous screen capture operation.

21. The method of claim 1 wherein the relation indicates the first portion is included within the second portion, and wherein the selectively adding includes using the selected previous screen capture operation to represent the new screen capture operation and discarding the new screen capture operation.

22. The method of claim 1 wherein the relation indicates the first portion is adjacent the second portion, and wherein the selectively adding includes adding a replacement screen capture operation to represent the new screen capture operation and the selected previous screen capture operation.

23. The method of claim 1 wherein the relation indicates the second portion is included within the first portion, and wherein the selectively adding includes replacing the selected previous screen capture operation with the new screen capture operation in the list.

24. A computer-readable medium storing in storage computer-executable instructions for causing a computer system programmed thereby to perform a method of capturing a screen area in display by a visual display unit, the method comprising:

at each of one or more pixel locations of a screen area being buffered by a display card frame buffer for display by a visual display unit that displays the screen area, scanning for a pixel value change in order to reduce use of bit block transfers when constructing a representation of the screen area, wherein the bit block transfers are operations for transferring pixel values from the display card frame buffer to system memory, and wherein the scanning at the pixel location includes:

comparing a pixel value at the pixel location in the screen area to an expected value;

when no pixel value change is detected, designating a block of the screen area including the pixel location to be provided without bit block transfers when constructing the representation of the screen area in the system memory;

otherwise, designating the block of the screen area including the pixel location to be provided with bit block transfer when constructing the representation of the screen area in the system memory;

joining one or more blocks of the screen area designated to be provided without bit block transfers with plural blocks of the screen area designated to be provided with bit block transfer to improve bit block transfer efficiency, including:

setting a boundary rectangle in the screen area around the plural blocks of the screen area designated to be provided with bit block transfer;

identifying the one or more blocks of the screen area designated to be provided without bit block transfers as being within the boundary rectangle in the screen area; and designating the boundary rectangle in the screen area to be provided with bit block transfer; and constructing the representation of the screen area in system memory based at least in part upon the block designations.

25. The computer-readable medium of claim 24 wherein the constructing includes capturing all of the screen area by bit block transfer from the display card frame buffer.

26. The computer-readable medium of claim 24 wherein the constructing includes providing at least some of the representation of the screen area without bit block transfers from the display card frame buffer and capturing at least some of the screen area by bit block transfer from the display card frame buffer.

27. The computer-readable medium of claim 24 wherein the method further comprises:

capturing a first screen area in a series by bit block transfer from the display card frame buffer; and for each of at least one subsequent screen area in the series, performing the comparing, the designating, and the constructing.

28. The computer-readable medium of claim 24 wherein the screen area shows an entire screen, a window, or a user-specified area.

29. In a screen capture tool, a method comprising:

based upon analysis of one or more display driver commands, identifying any regions of a screen area to capture by transfer of pixel information from a display card frame buffer, that buffers the screen area for display by a visual display unit that displays the screen area wherein each of the one or more display driver commands is a drawing command sent from an operating system and received by one or more display drivers, and wherein the analysis includes for a new display driver command of the one or more display driver commands:

converting the new display driver command into a new screen capture operation;

comparing the new screen capture operation to one or more previous screen capture operations in a list, wherein the comparing includes:

identifying a first portion of the screen area that is affected by the new screen capture operation;

identifying a second portion of the screen area that is affected by a selected one of the previous screen capture operations in the list;

identifying a relation between the first portion of the screen area and the second portion of the screen area; and setting a first region of the regions of the screen area based upon the relation between the first portion of the screen area and the second portion of the screen area; and depending on results of the comparing between the new screen capture operation and the one or more previous screen capture operations in the list, selectively updating the list to assimilate the new screen capture operation into the list; and transferring the pixel information from the display card frame buffer to system memory for the identified regions.

30. The method of claim 29 wherein the selectively updating includes simplifying the list to reduce the number of screen capture operations while also reducing transfers from the display card frame buffer.

31. The method of claim 29 wherein the new screen capture operation parameterizes movement of pixel information of a base captured screen area in system memory for the captured screen area.

32. The method of claim 29 wherein the new screen capture operation parameterizes cursor position or cursor shape.

33. The method of claim 29 wherein the new screen capture operation parameterizes text display.

34. The method of claim 29 wherein the new screen capture operation specifies a bitmap to transfer from the display card frame buffer.

35. A computer-readable medium storing in storage computer-executable instructions for causing a computer system programmed thereby to perform the method of claim 29.

36. The method of claim 29 wherein a screen capture display driver receives the one or more display driver commands, and wherein the screen capture display driver is different than a primary display driver associated with the display card frame buffer.

37. The method of claim 29 wherein the drawing command for at least one of the one or more display driver commands is a simple line drawing command, a rectangular bitmap drawing command, a parameterized cursor drawing command, a parameterized shape drawing command, or a text drawing command.

38. In a screen capture tool, a method comprising:

scanning pixel values at pixel locations of a screen area in a display card frame buffer to identify pixel value changes in portions of the screen area and thereby reduce use of bit block transfers when constructing a representation of the screen area, wherein the display card frame buffer buffers the screen area for display by a visual display unit that displays the screen area, wherein the bit block transfers are operations for transferring pixel values from the display card frame buffer to system memory, and wherein for a given pixel location of the pixel locations the scanning includes:

comparing a pixel value at the given pixel location in the screen area to an expected value;

when no pixel value change is identified, designating a portion of the screen area including the given pixel location to be provided without bit block transfers when constructing the representation of the screen area in the system memory;

otherwise, designating the portion of the screen area including the given pixel location to be provided with bit block transfer when constructing the representation of the screen area in the system memory;

joining plural portions of the screen area in which pixel value changes are identified in the scanning with one or more portions of the screen area in which no pixel value change is identified in the scanning, thereby improving bit block transfer efficiency including:

setting a boundary rectangle in the screen area around the plural portions of the screen area in which pixel value changes are identified in the scanning;

identifying the one or more portions of the screen area in which no pixel value change is identified in the scanning as being within the boundary rectangle around the plural portions of the screen area in which pixel value changes are identified in the scanning; and designating the boundary rectangle in the screen area to be provided with bit block transfer; and transferring pixel information from the display card frame buffer to the system memory for the joined portions of the screen area within the boundary rectangle.

39. The method of claim 38 wherein one pixel value in each of the portions of the screen area is scanned.

40. The method of claim 38 further comprising adaptively changing configuration of the portions.

41. The method of claim 38 further comprising changing locations within the portions for the scanning.

42. A computer-readable medium storing in storage computer-executable instructions for causing a computer system programmed thereby to perform a method of claim 38.

43. A computer system comprising:

a display card;

a processor;

system memory; and a screen capture tool for retrieving from the display card pixel information for screen areas based upon analysis of display driver commands, the screen areas being buffered by a display card frame buffer of the display card for display by a visual display unit wherein each of the analyzed display driver commands is a drawing command sent from an operating system and received by one or more display drivers, and wherein the analysis includes for a new display driver command of the one or more display driver commands:

converting the new display driver command into a new screen capture operation;

comparing the new screen capture operation to one or more previous screen capture operations in a list, wherein the comparing includes:

identifying a first portion of a screen area that is affected by the new screen capture operation;

identifying a second portion of the screen area that is affected by a selected one of the previous screen capture operations in the list;

identifying a relation between the first portion of the screen area and the second portion of the screen area; and setting a first region of one or more regions of the screen area based upon the relation between the first portion of the screen area and the second portion of the screen area; and depending on results of the comparing between the new screen capture operation and the one or more previous screen capture operations in the list, selectively updating the list to assimilate the new screen capture operation into the list.

44. The computer system of claim 43 wherein the screen capture tool simplifies the list to reduce bit block transfer usage in the selective updating of the list.

45. The computer system of claim 43 wherein the analysis indicates base screen area pixel information in the system memory for the screen capture tool to move for a current screen area.

46. The computer system of claim 43 wherein the analysis indicates cursor information for the screen capture tool to use in a current screen area.

47. The computer system of claim 43 wherein the screen capture tool assimilates the new display driver command into the list based upon one or more criteria that include reducing bit block transfers, reducing number of screen capture operations, and reducing memory page swapping.

48. The computer system of claim 43 wherein as part of the converting the screen capture tool categorizes the new display driver command as one of plural types, the plural types including move commands, refresh commands, and cursor commands.

49. The computer system of claim 43 wherein a screen capture display driver receives the display driver commands, and wherein the screen capture display driver is different tan a the primary display driver for the computer system.

50. The computer system of claim 43 wherein the drawing command is a simple line drawing command, a rectangular bitmap drawing command, a parameterized cursor drawing command, a parameterized shape drawing command, or a text drawing command.

* * * * *